US012628978B2

(12) United States Patent
Leppert et al.

(10) Patent No.: US 12,628,978 B2
(45) Date of Patent: *\*May 19, 2026*

(54) SELF-CLEANING FROTHING APPLIANCE

(71) Applicant: Hamilton Beach Brands, Inc., Glen Allen, VA (US)

(72) Inventors: Kevin Leppert, Glen Allen, VA (US); Dane Starr, Glen Allen, VA (US); Patrick Mulvaney, Glen Allen, VA (US); Veronika McKenney, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 713 days.

This patent is subject to a terminal disclaimer.

(21) Appl. No.: 17/957,874

(22) Filed: Sep. 30, 2022

(65) Prior Publication Data

US 2023/0107194 A1      Apr. 6, 2023

Related U.S. Application Data

(60) Provisional application No. 63/325,000, filed on Mar. 29, 2022, provisional application No. 63/318,688, (Continued)

(51) Int. Cl.
*A47J 31/60*          (2006.01)
*A47J 31/00*          (2006.01)
(Continued)

(52) U.S. Cl.
CPC ............. *A47J 31/60* (2013.01); *A47J 31/002* (2013.01); *A47J 31/4496* (2013.01); *A47J 31/461* (2018.08); *A47J 31/462* (2013.01)

(58) Field of Classification Search
None
See application file for complete search history.

(56) References Cited

U.S. PATENT DOCUMENTS

| | | | | | | |
|---|---|---|---|---|---|---|
| 2,907,265 | A | * | 10/1959 | Ford | ....................... | A47J 31/40 99/275 |
| D662,756 | S | * | 7/2012 | Steiner | ........................... | D7/311 |

(Continued)

FOREIGN PATENT DOCUMENTS

WO          WO-9406333 A1 *  3/1994  .............. A47J 36/08

*Primary Examiner* — Abbas Rashid
(74) *Attorney, Agent, or Firm* — Alexander D. Raring

(57)          ABSTRACT

An automated self-cleaning frothing appliance includes: a housing having a base, a tower extending upwardly from the base, and a canopy extending from an upper portion of the tower above the base; a vessel mounted beneath the canopy, the vessel having an outlet at a lower end; a frothing tool extending from the canopy into the vessel; a first fluid pathway in the housing to receive water from a water source and deliver water into the vessel; a valve positioned to selectively open and close the outlet to the vessel; a valve-opening mechanism attached to the housing to selectively open and close the valve; a drain positioned beneath the outlet to receive water draining from the outlet; a second fluid pathway routed from the drain to deliver water to an external receptacle; and a controller operatively connected with the drive unit, the first fluid pathway and the valve-opening mechanism.

19 Claims, 43 Drawing Sheets

Related U.S. Application Data filed on Mar. 10, 2022, provisional application No. 63/271,394, filed on Oct. 25, 2021, provisional application No. 63/251,781, filed on Oct. 4, 2021.

(51) Int. Cl.
 *A47J 31/44* (2006.01)
 *A47J 31/46* (2006.01)

(56) References Cited

U.S. PATENT DOCUMENTS

| | | | |
|---|---|---|---|
| 8,663,724 B1 * | 3/2014 | Banasik | A47J 31/02 |
| | | | 426/433 |
| 2010/0236416 A1 * | 9/2010 | Bonsch | A47J 31/4485 |
| | | | 99/323.1 |
| 2014/0264972 A1 * | 9/2014 | Studor | B01F 23/235 |
| | | | 261/121.1 |
| 2021/0106167 A1 * | 4/2021 | Crozier | A47J 31/58 |

* cited by examiner

18

60

64

38

C

2ND RINSE

410

429

431

414

417

428

425

427

432

424

420

725r

716b

733

731

725

729

735

728

710

716

SELF-CLEANING FROTHING APPLIANCE

RELATED APPLICATION

The present application claims priority from and the benefit of U.S. Provisional Patent Application Nos. 63/251,781, filed Oct. 4, 2021; 63/271,394, filed Oct. 25, 2021; 63/318,688, filed Mar. 10, 2022; and 63/325,000, filed Mar. 29, 2022, the disclosures of which are all hereby incorporated herein by reference in full.

FIELD OF THE INVENTION

The present invention relates generally to appliances, and more particularly to frothing appliances.

BACKGROUND

Coffee drinks, such as cappuccinos, are very popular both in the home and at retail providers. One challenge with making such coffee drinks is frothing milk, such that a specialized device is often required to suitably froth milk. Froth milk can be added to a coffee base as a foamy "head".

For retail providers, it may be desirable for the process of frothing milk and/or other ingredients and dispensing the same to be done via a novel apparatus, thereby reducing time and labor in the preparation of multiple servings of a frothed beverage.

SUMMARY

As a first aspect, embodiments of the disclosure are directed to an automated, self-cleaning, frothing appliance. The appliance comprises: a housing having a base, a tower extending upwardly from the base, and a canopy extending generally horizontally from an upper portion of the tower and above the base; a vessel mounted beneath the canopy, the vessel having an open upper end and an outlet at a lower end; a frothing tool extending from the canopy into the vessel, the frothing tool being operatively connected with a drive unit mounted in the housing; a first fluid pathway in the housing configured to receive water from a water source and routed to deliver water into the vessel; a valve positioned to selectively open and close the outlet to the vessel; a valve-opening mechanism attached to the housing configured to selectively open and close the valve; a drain positioned beneath the outlet to receive water draining from the outlet; a second fluid pathway routed from the drain and configured to deliver water to an external waste water receptacle; and a controller that is operatively connected with the drive unit, the first fluid pathway and the valve-opening mechanism.

As a second aspect, embodiments of the disclosure are directed to an automated self-cleaning frothing appliance comprising: a housing having a base, a tower extending upwardly from the base, and a canopy extending generally horizontally from an upper portion of the tower and above the base; a vessel removably mounted beneath the canopy, the vessel having an open upper end and an outlet at its lower end; a frothing tool extending from the canopy into the vessel, the frothing tool being operatively connected with a drive unit mounted in the housing; a first fluid pathway in the housing configured to receive water from a water source and routed to deliver water into the vessel; a valve positioned to selectively open and close the outlet to the vessel; a valve-opening mechanism attached to the housing configured to selectively open and close the valve; a cupholder positioned beneath the outlet and configured to hold a cup during froth dispensing, the cupholder including a drainage section and configured to receive water from the vessel; a second fluid pathway routed from the drainage section of the cupholder and configured to deliver water to an external waste water receptacle; a cupholder lifting mechanism mounted to the housing and attached to the cupholder that is configured to raise and lower the cupholder relative to the base; and a controller that is operatively connected with the drive unit, the first fluid pathway, the valve-opening mechanism; and the cupholder lifting mechanism.

As a third aspect, embodiments of the disclosure are directed to a method of operating a frothing appliance. The method comprises:

(a) filling a vessel with liquid to be frothed;

(b) mounting the vessel on a housing of an automated frothing appliance;

(c) driving a frothing tool mounted to the housing, the frothing tool extending within the vessel, to froth the liquid within the vessel;

(d) opening a valve in the vessel with a first mechanism mounted to the housing, wherein the opening of the valve enables frothed liquid to drain into a cup beneath the vessel;

(e) passing water from an external water source through the housing and into the vessel;

(f) closing the valve to the vessel via the mechanism;

(g) agitating the water in the vessel with the frothing tool; and (h) opening the valve with a second mechanism to permit water to drain through the outlet in the vessel into a drain mounted on the housing, the drain leading to an external waste water receptacle.

DETAILED DESCRIPTION

Figure 1:
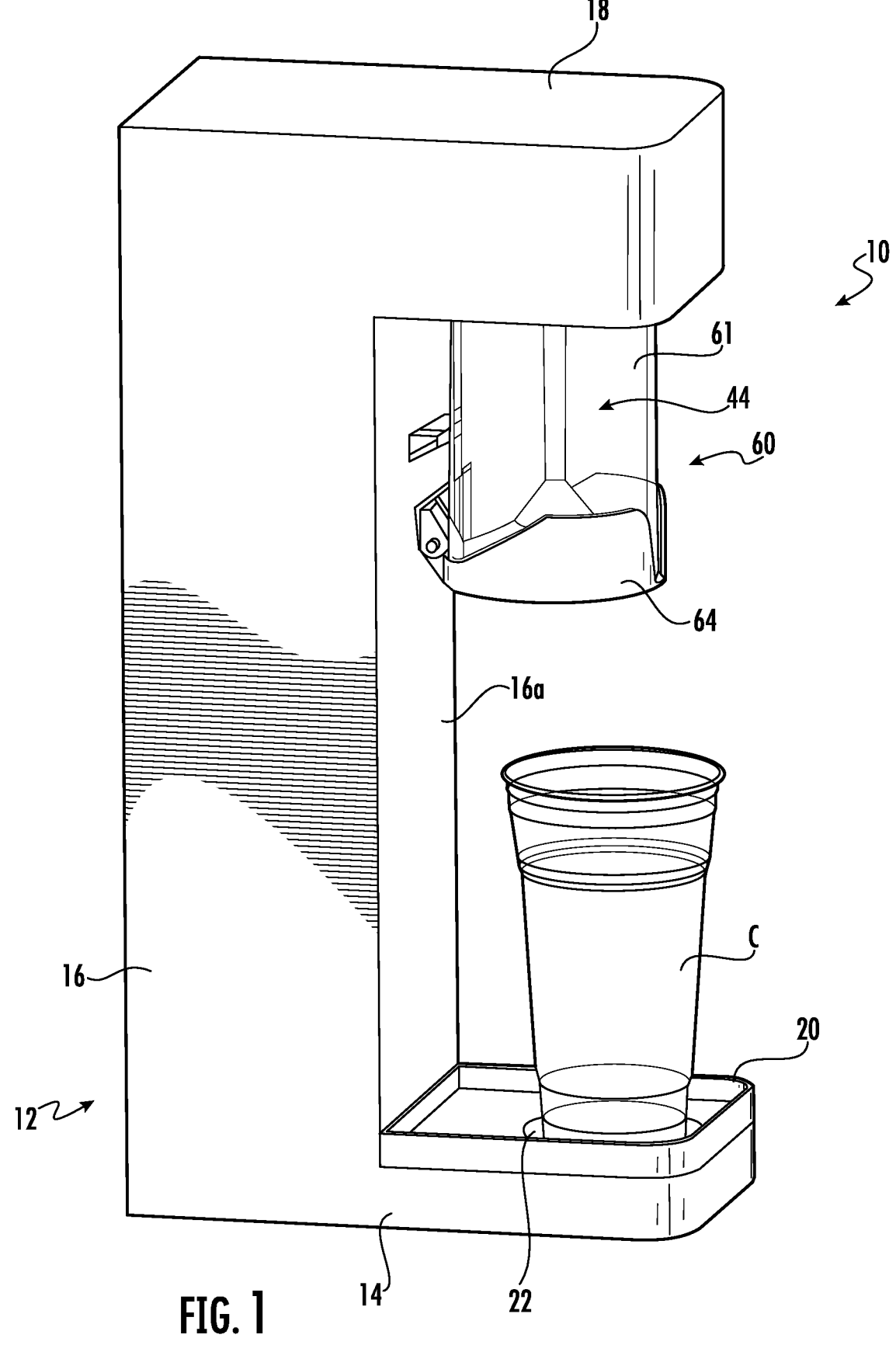
FIG. 1 is a front perspective view of a frothing appliance according to embodiments of the invention.

The present appliance disclosure is described more fully hereinafter with reference to the accompanying drawings, in which various embodiments are illustrated. This disclosure may, however, be embodied in many different forms and should not be construed as limited to the embodiments set forth herein; rather, these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein and are not intended to indicate preference for one or more embodiments discussed herein compared to one or more other embodiments.

Referring now to the drawings, an automated self-cleaning frothing appliance, designated broadly at 10, is shown in FIGS. 1-12. The appliance 10 includes a generally C-shaped housing 12 with a base 14, a tower 16 that extends upwardly from the rear end of the base 14, and an overhanging canopy 18 that extends forwardly from the upper end of the tower 16. The base 12 includes a cup tray (or cupholder) 20 that has a generally circular recess or drain 22 for receiving a cup. The recess 22 has an outlet 24 near its center that leads to a drain line 26 (shown schematically in FIG. 2); the drain line 26 may be fluidly connected with an external waste water receptacle, such as plumbing that conveys waste water from the premises, and thus defines a fluid pathway 27 between the drain 24 and the external waste water receptacle.

Figure 2:
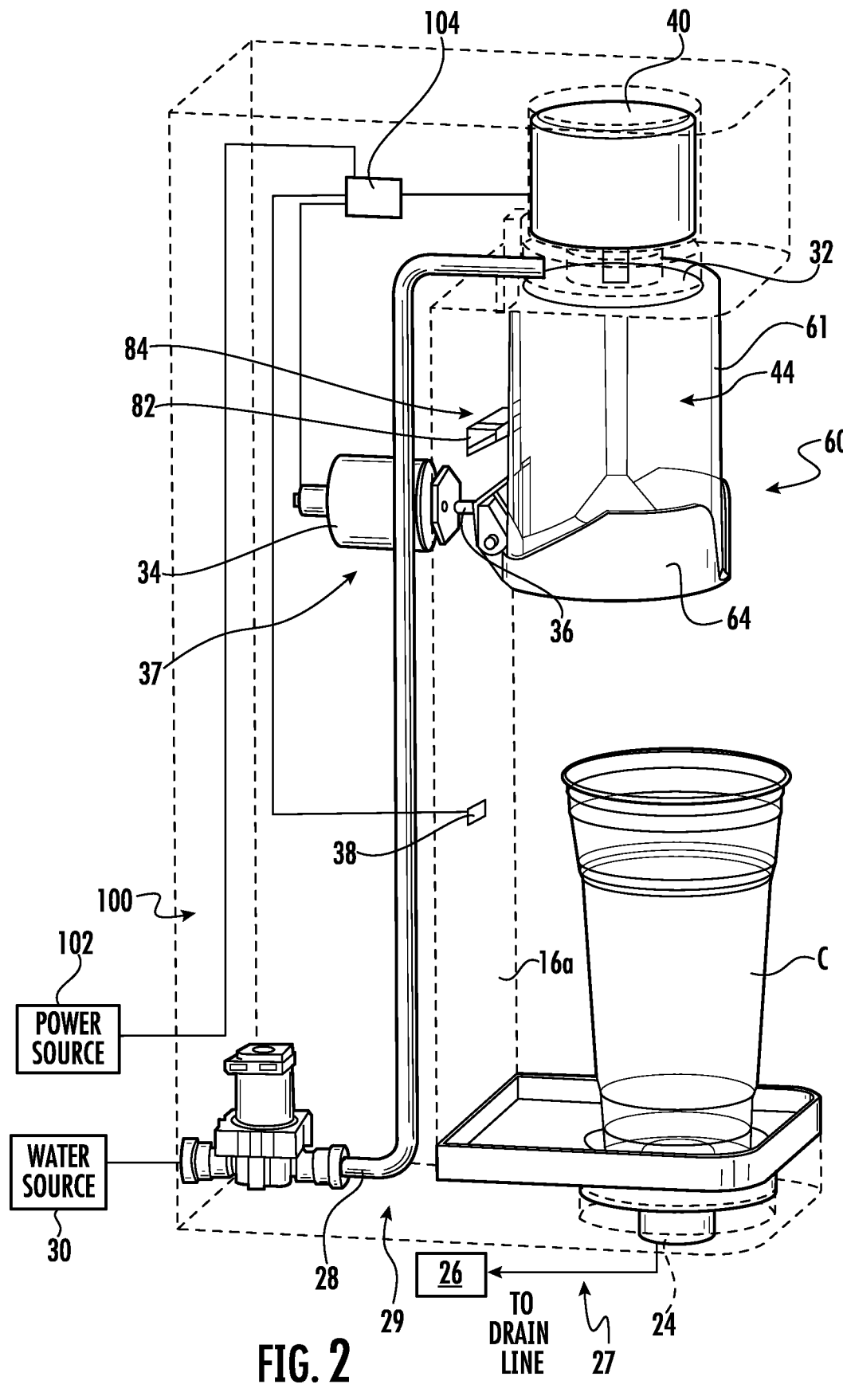
FIG. 2 is a front perspective view of the frothing appliance of FIG. 1 with the housing shown in transparent form to permit illustration of internal components.

As shown in FIG. 2, the tower 16 houses a water inlet line 28 that is fluidly connected to an external water source (shown schematically at 30 in FIG. 2), such as plumbing that conveys water into and through the premises or a dedicated water reservoir attached to the housing 12. The water inlet line 28 is routed upwardly within the tower 16, then forwardly into the canopy 18 to an annular showerhead 32 (see also FIGS. 3 and 8), and as such, defines a fluid pathway 29 between the water source 30 and a frothing vessel 60 discussed below. A solenoid 34 is mounted on the forward wall 16a of the tower 16; the solenoid 34 includes a rod 36 that extends through the front wall 16a (see also FIG. 8). The solenoid 34 and rod 36 are components of a valve-opening mechanism 37 that opens a gate 64 discussed below. Further, a cup sensor 38 (typically an electric eye or the like) is mounted to the front wall 16a and positioned to detect the presence of a cup positioned on the cupholder 20.

Figure 3:
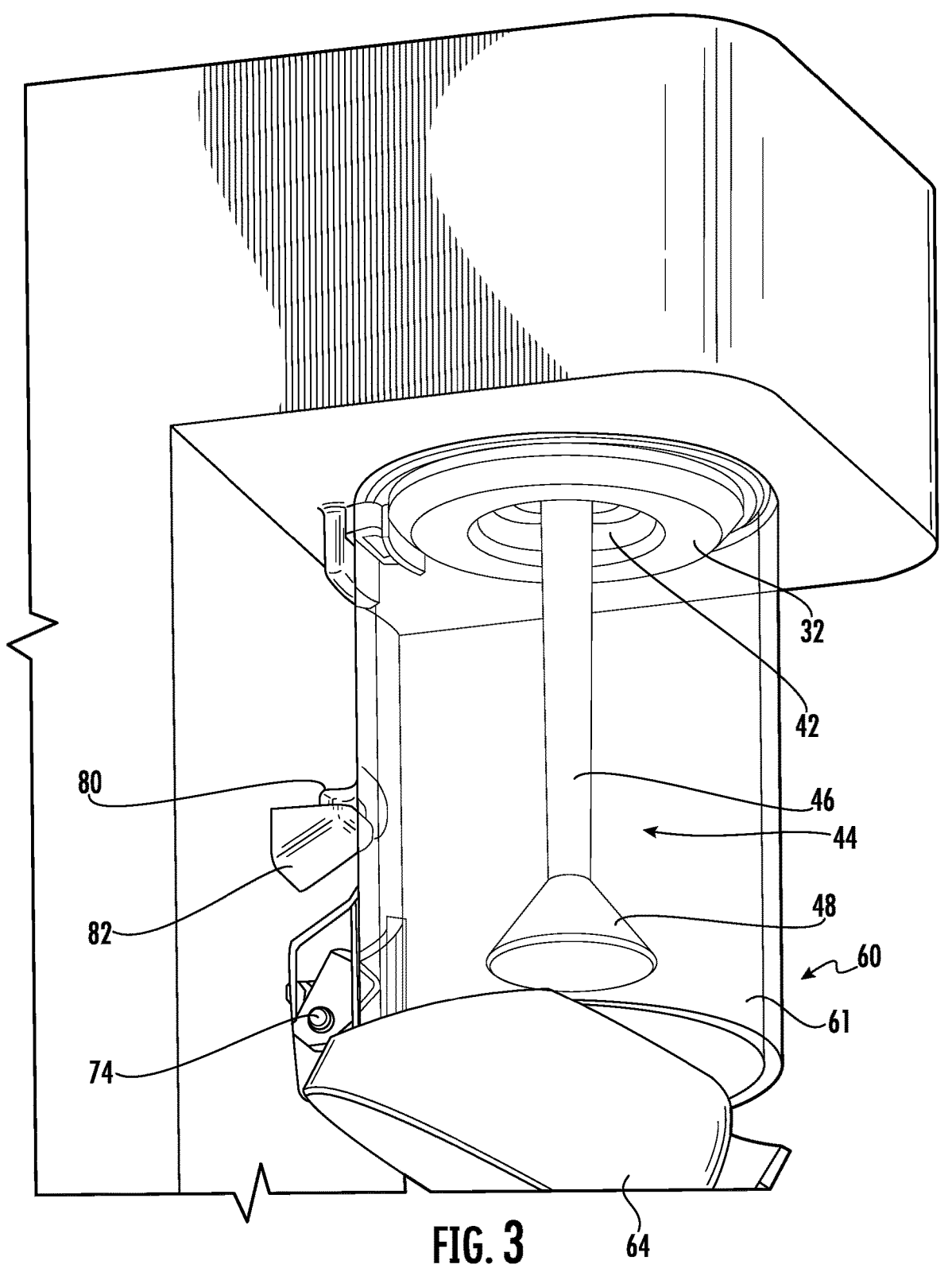
FIG. 3 is a partial bottom perspective view of the frothing appliance of FIG. 1 showing the vessel and the underside of the canopy.
Figures 4A, 4B, 5, 6:
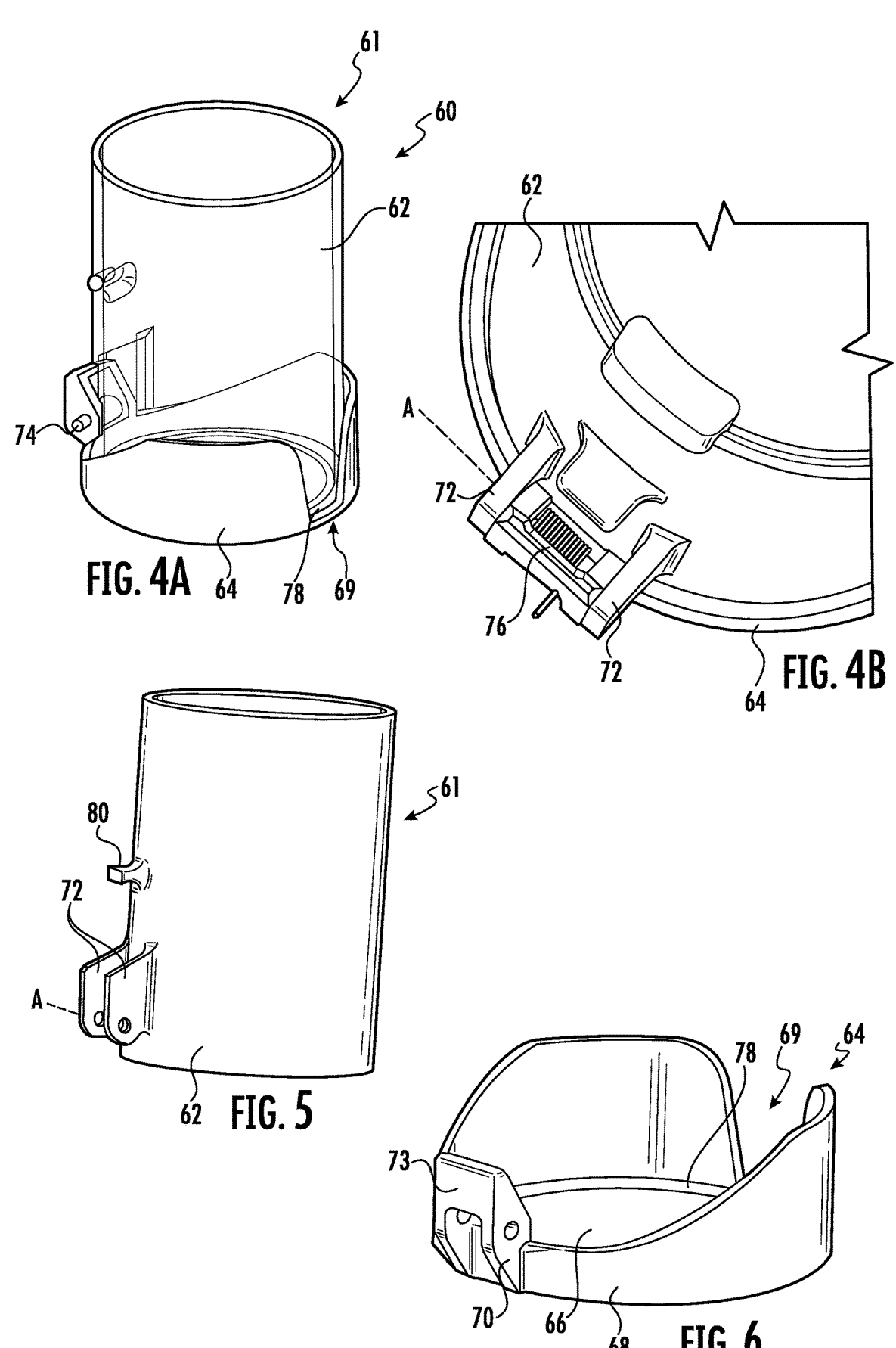
FIG. 4A is a front perspective view of the vessel of the frothing appliance of FIG. 1, with the gate in its closed position.
FIG. 4B is a partial top rear perspective view of the vessel of FIG. 4A.
FIG. 5 is a rear perspective view of the tube of the vessel of FIG. 4A.
FIG. 6 is a rear perspective view of the gate of the vessel of FIG. 4A.
Figure 8:
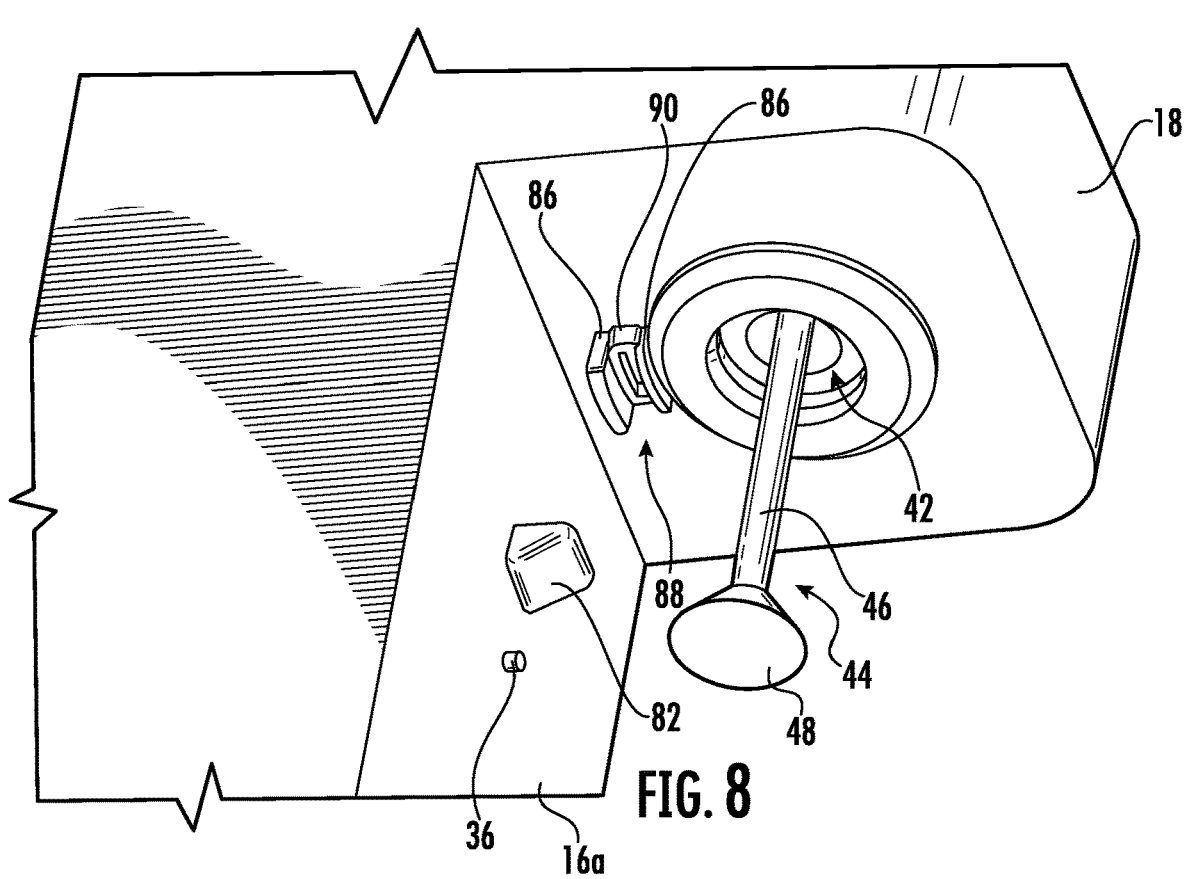
FIG. 8 is a partial bottom perspective view of the canopy, frothing tool and showerhead of the appliance of FIG. 1 with the vessel removed.

Referring again to FIG. 2, and also to FIGS. 3 and 8, a motor 40 or other drive unit is mounted in the canopy 18 above an opening 42 within the showerhead 32. A frothing tool 44 having a shaft 46 and an agitator 48 is mounted to the motor 40, with the shaft 46 extending downwardly through the showerhead 32 and the agitator 48 being mounted on the lower end of the shaft 46. The agitator 48 may be of many different configurations that are suitable for frothing, but in some embodiments may be conical in shape, such as that described in U.S. Patent Publication No. 2019/0328171 to Leppert, the disclosure of which is hereby incorporated herein by reference in full.

As can be seen in FIGS. 4A-6, a frothing vessel 60 is generally cylindrical, with a tube 61 having a side wall 62 that is open at its upper end. The lower end of the vessel 60 is covered with a pivoting gate 64 that acts as a valve for the vessel 60. The gate 64 (FIGS. 4A, 4B and 6) has a floor 66, a rim 68, and a projection 70 that extends rearwardly from the rim 68. The projection 70 has a bearing surface 73. At its front end, the rim 68 has a gap 69 that extends downwardly to the floor 66. Two flanges 72 extend rearwardly from the rear of the side wall 62 of the tube 61 and sandwich the projection 70. A pin 74 extends between the flanges 72 and through the projection 70 to define a pivot axis A. As shown in FIG. 4B, a torque spring 76 encircles the pin 74 and engages the projection 70 and the flanges 72 to bias the gate 64 toward a closed position, in which the gate 64 covers the lower end of the vessel 60. The floor 66 of the gate 64 also has a gasket 78 on the periphery of its upper surface that is positioned to engage and provide a seal with the lower edge of the side wall 62 (in some embodiments, the gasket 78 may be overmolded into the gate 64 during manufacturing).

Figure 7:
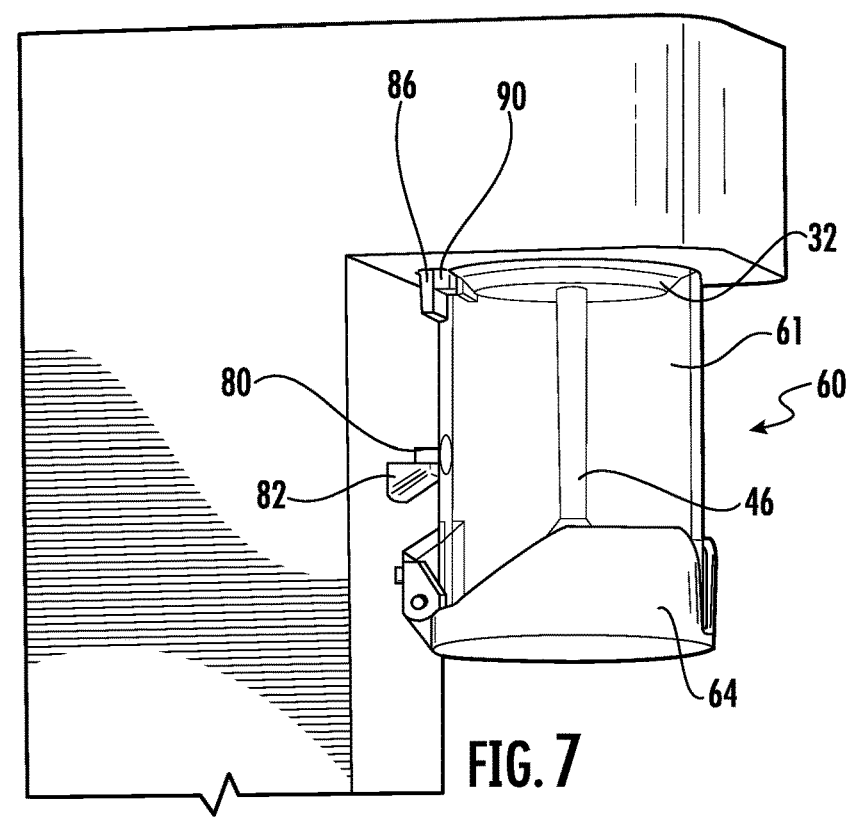
FIG. 7 is a partial front perspective view of the frothing appliance of FIG. 1 with the vessel mounted thereon.

The frothing vessel 60 can be removably mounted on the housing 12 by positioning a small hook 80 that extends rearwardly from the side wall 62 within a pocket 84 in a ledge 82 that projects forwardly from the front wall 16a (see FIGS. 3, 7 and 8). Also, as shown in FIG. 8, two fingers 86 that depend from the lower surface of the canopy 18 form a channel 88 into which the upper edge of the tube 61 can fit. When so positioned, the upper edge of the side wall 62 of the tube 61 engages the lower surface of the canopy 18. In some embodiments, either the upper edge of the tube 61 or the lower surface of the canopy 18 includes a gasket, O-ring, or other sealing device to provide a seal between the tube 61 and the canopy 18. Also, as shown in FIG. 8, in some embodiments a spring-loaded plunger 90 is positioned within the channel 88 to urge the vessel 60 downwardly and "lock" it into place.

When mounted as described above, the vessel 60 is positioned on the housing 12 for frothing. Notably, the bearing surface 73 of the projection 70 of the gate 64 is positioned directly in front of the rod 36 of the solenoid 34 (see, e.g., FIGS. 2, 10A and 10B).

Shown schematically in FIG. 2, the appliance 10 includes a power circuit 100 that is operatively connected with an external power source 102 (such as a wall outlet or the like). The power circuit 100 is also operatively connected with a controller or processor 104 that, in turn, is connected with the cup sensor 38, the solenoid 34, the motor 40, and in some instances a pump (not shown) for conveying water in the water inlet line 28.

In operation, a user (such as a barista working in a coffee shop) disengages the frothing vessel 60 from the appliance 10 and fills the vessel 60 with the ingredients (typically milk and perhaps some flavoring ingredients) to be frothed. The vessel 60 is replaced on the appliance 10 in the manner described above, with the hook 80 of the vessel 60 received in the pocket 84 of the ledge 82, and the upper edge of the side wall 62 of the tube 61 received in the channel 88 and engaging the lower surface of the canopy 18 (see FIG. 7). In this position the shaft 46 and agitator 48 of the frothing tool 44 extend into the vessel 60, with the agitator 48 at least partially immersed in the liquid in the vessel 60.

Figure 9:
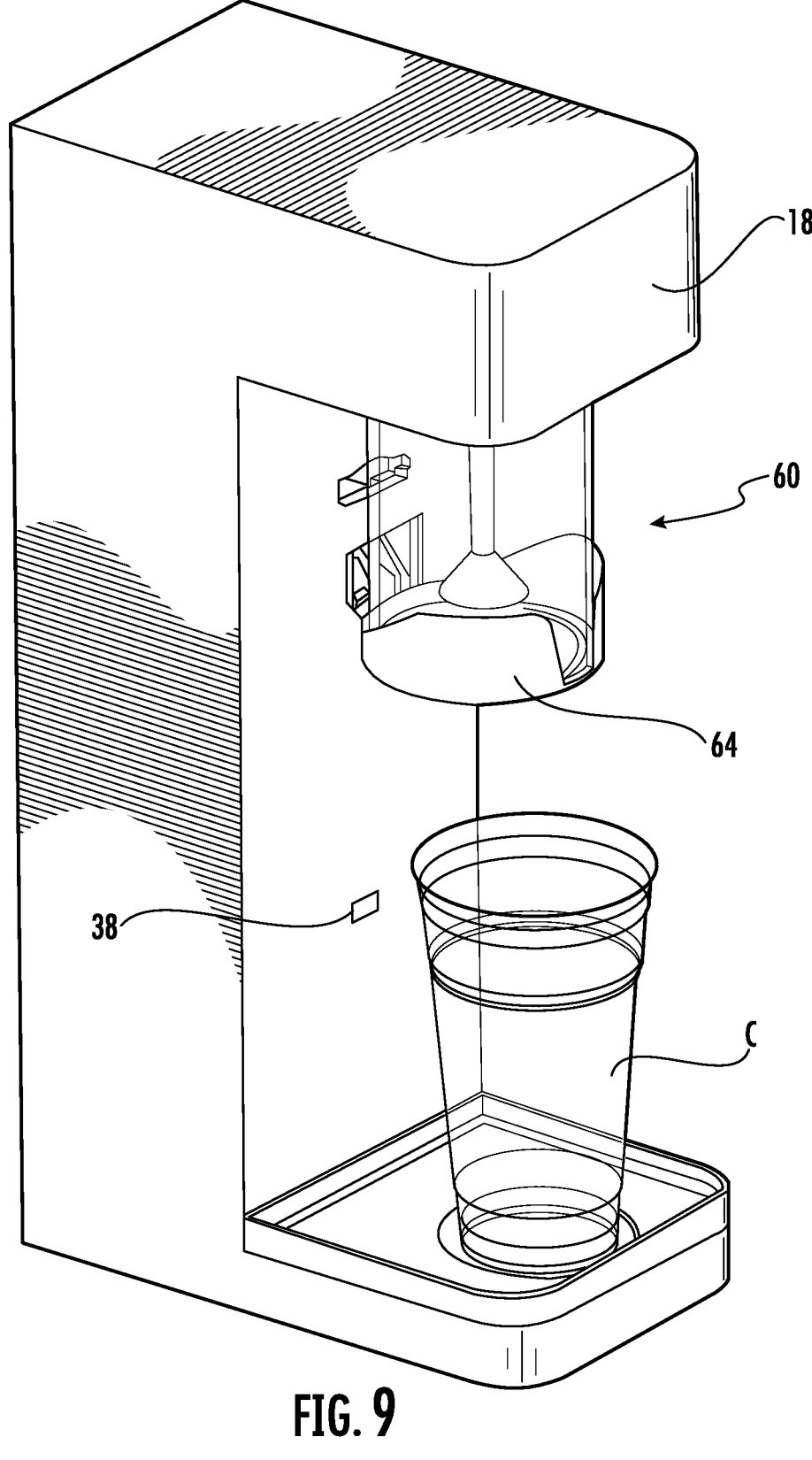
FIG. 9 is a front perspective view of the frothing appliance of FIG. 1 during frothing.

The user places a cup C in the recess 22 of the cupholder 20, where it can be detected by the cup sensor 38 (FIG. 9). The user then activates the appliance 10 (typically by manipulating a button, dial, or the like). If the cup sensor 38 detects the presence of a cup, the motor 40 rotates the frothing tool 44 within the vessel 60 at a speed (e.g., 0 to 6000 rpm) and/or for a duration (e.g., 0 to 20 seconds) sufficient to froth the liquid. As an example, a ¼ cup of milk is typically frothed at 4000-6000 rpm for 8-12 seconds.

Figures 10A, 10B, 11:
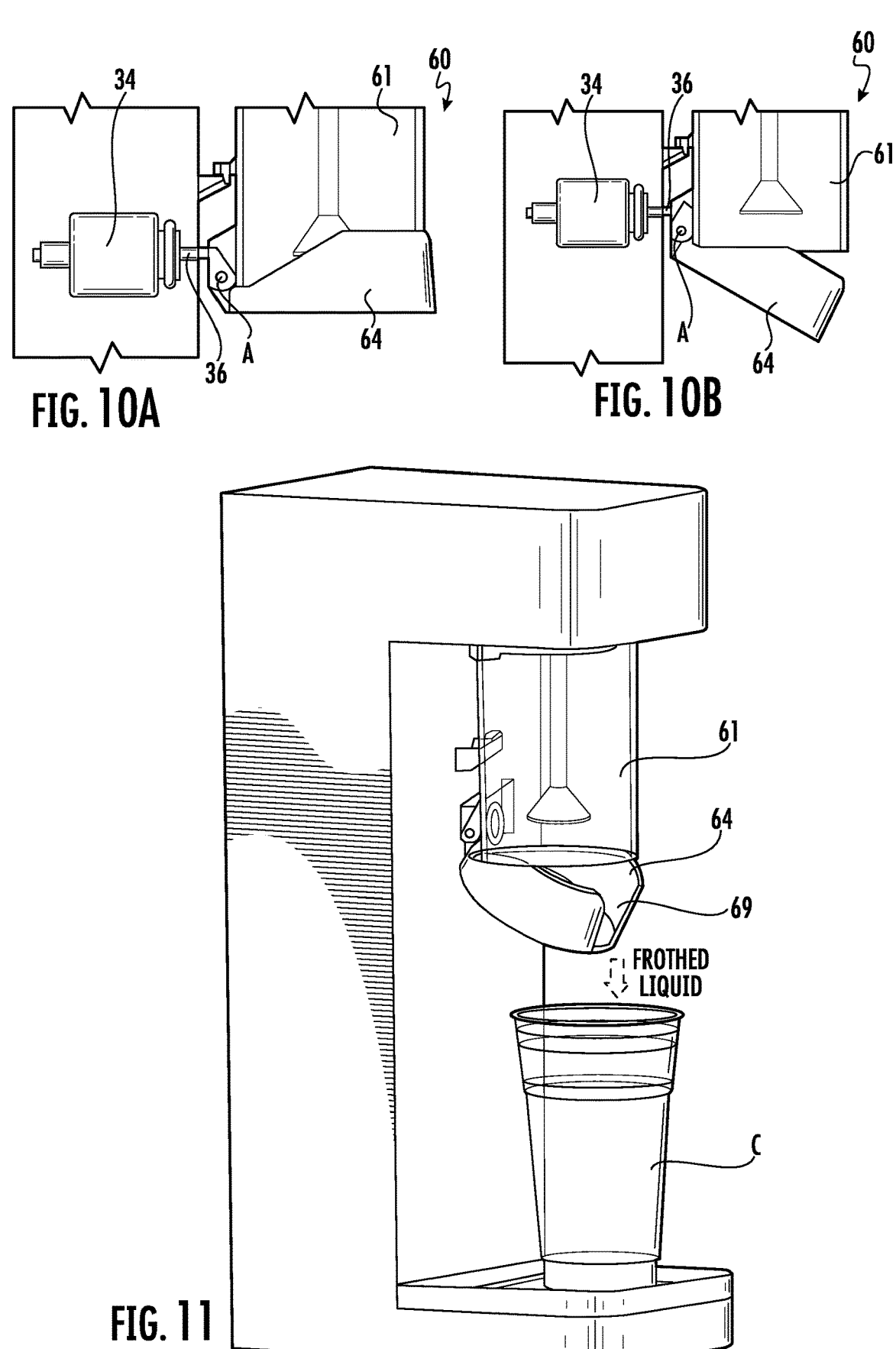
FIGS. 10A and 10B are side views of the solenoid and vessel of the frothing appliance of FIG. 1, with the gate of the vessel in its closed position (FIG. 10A) and open position (FIG. 10B).
FIG. 11 is a front perspective view of the frothing appliance of FIG. 1 during dispensing of frothed liquid into a cup, with the gate of the vessel it its open position to allow froth to drain into the cup.

Once frothing is complete (again, typically based on a preselected duration), the controller 104 signals the solenoid 34 to actuate, which causes the rod 36 to extend forwardly into the bearing surface 73 of the projection 70 of the gate 64. Such extension causes the upper end of the projection 70 to move forwardly, which in turn pivots the gate 64 about the axis A (this pivotal movement is clockwise from the vantage point of FIGS. 10A and 10B). Pivoting of the gate 64 draws the front end of the gate 64 downwardly and away from the side wall 62, such that the floor 66 of the gate 64 tilts downwardly from rear to front (FIGS. 10B and 11). In this orientation, foamed liquid in the vessel 60 is free to slide down the floor, through the gap 69 in the rim 68 (which can act as a spout or outlet), and into the cup C below.

Typically, the angle of the floor 66 is between about 15 and 60 degrees (e.g., 25-40 degrees), which may be sufficient to urge, via gravity, frothed liquid to slide down the floor 66 and into the cup. Frothed liquid contains a great deal of air, such that the density of the liquid decreases upon frothing. Frothing the liquid into a foam also increases the viscosity of the liquid. The decrease in density and the increase in viscosity act to resist the tendency of the frothed liquid to flow out of the gate 64 and into the cup C. Tilting of the gate 64 as described can encourage frothed liquid to flow into the cup C. Such flow may also be impacted by the width of the gap 69 in the rim 68 of the gate 64; in some embodiments, the gap 69 may be between about 0.75 and 2 inches (e.g., 1-1.5 inches).

Figure 12:
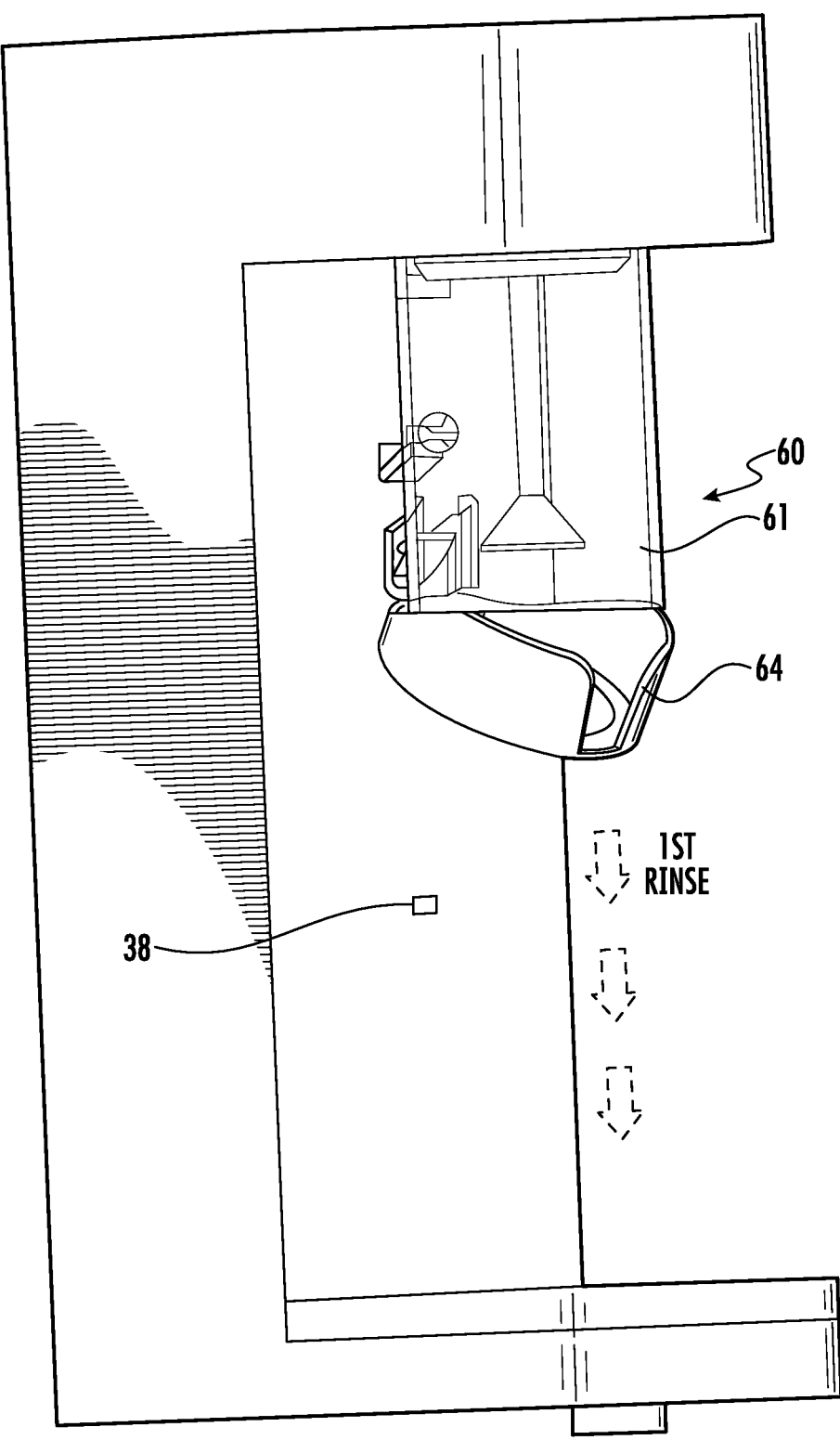
FIG. 12 is a front perspective view of the frothing appliance of FIG. 1 during a first rinsing step, with the gate of the vessel in its open position to allow rising water to drain into the outlet in the cupholder.

Once the frothed liquid has flowed into the cup C, the user may remove the cup C (which now has a frothed head atop the beverage therein) from the cupholder 20. Removal of the cup C is detected by the cup sensor 38, which signals the water source to provide water to the vessel 60 through the fluid pathway 29; water flows through the water inlet line 28 to the showerhead 32, is sprayed into the vessel 60 (which still has an open gate 64) for rinsing, and drains into the recess 22 and drainage outlet 24 for removal along the fluid pathway 27 (FIG. 12). This action can provide automated cleaning of the vessel 60.

Figure 13:
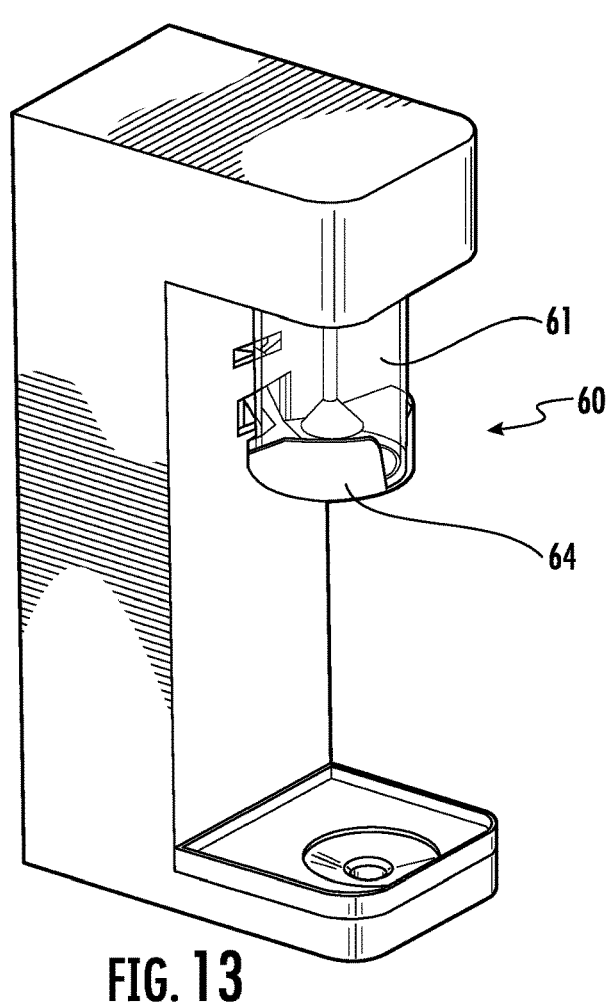
FIG. 13 is a front perspective view of the frothing appliance of FIG. 1 during a second rinsing step, with the gate of the vessel in its closed position.

After a preselected duration (e.g., 2 to 5 seconds), the controller 104 signals the solenoid 34 to retract the rod 36. This action causes the gate 64, which as noted above is biased toward the closed position by the torque spring 76, to close. Water continues to flow into the closed vessel 60 until it is partially filled. The controller 104 then signals the motor 40 to rotate the frothing tool 44 to agitate the water in the vessel 60 for more thorough cleaning (FIG. 13). This second rinsing step continues for a set duration (e.g., 2 to 5 seconds), after which the controller 104 deactivates the motor 40. The controller 104 also actuates the solenoid 34 again, causing the gate 64 to open to allow the water from the second rinsing to drain into the recess 22 and outlet 24

Figure 14:
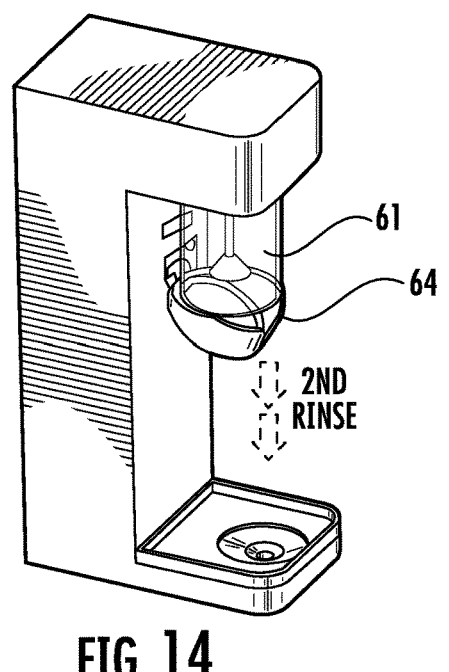
FIG. 14 is a front perspective view of the frothing appliance of FIG. 1 during the draining of rinsing water following the second rinsing step, with the gate of the vessel in its open position.
Figure 14:
Figure 15:
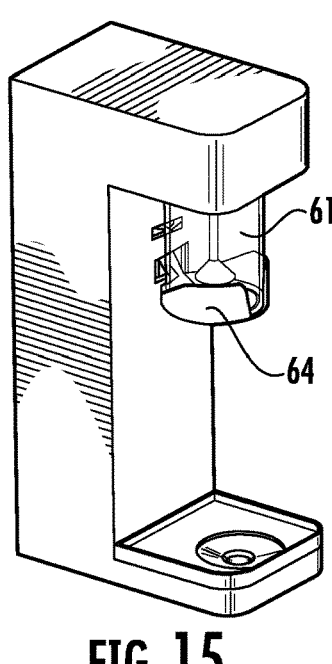
FIG. 15 is a front perspective view of the frothing appliance of FIG. 1 after the second rinsing step, with the gate of the vessel in its closed position, such that the frothing appliance is ready for another frothing operation.

(FIG. 14). After a preselected duration (e.g., 2 to 5 seconds), the controller 104 signals the solenoid 34 to retract the rod 36 once again, thereby allowing the gate 64 to close (FIG. 15). At this point the appliance 10 is ready to perform another frothing.

The foregoing demonstrates that the frothing appliance 10 is capable of highly automated frothing and rinsing, only requiring the user to fill the vessel 60 with frothing liquid, place the cup C on the cupholder 22, activate the appliance 10, and remove the cup C once the frothed liquid has been dispensed into the cup C. The appliance 10 can complete the remaining tasks for frothing and cleaning without requiring intervention from the user.

Those of skill in this art will appreciate that the frothing appliance may take different forms than those described. As one example, rather than relying on the interaction between (a) the hook 80 and the ledge 82 and (b) the upper edge of the tube 61 in the channel 88 to mount the vessel 60 on the housing 12, the frothing appliance may employ magnets or the like in the vessel 60 and the canopy 18 to mount the vessel 60. As another example, the torsion spring 76 may be omitted, and magnets may be included in the projection 70 that attract the rod 36 of the solenoid 34 to bias the gate 64 toward the closed position. As a further example, the cup sensor 38 may be located elsewhere on the frothing appliance 10 (for example, it may be positioned in the recess 22), or it may be omitted. As still another example, the frothing tool 44 may have a different configuration, and in particular the agitator 48 may be formed as a series of blades, fins or the like. Another variation may utilize a servo device or other linear actuator in lieu of the solenoid 34 to drive the valve-opening mechanism. As an additional variation, in some embodiments the gate 64 may be opened during some or all of the frothing step, such that draining can begin immediately.

As a further variation, the frothing appliance may include a sensor mounted on the tower above the cup sensor 38 that can detect the height of foam added to the cup C. In this embodiment, the draining of froth would terminate once the desired height was reached, with any froth remaining in the vessel being rinsed out with water in the first rinsing operation.

Figure 16:
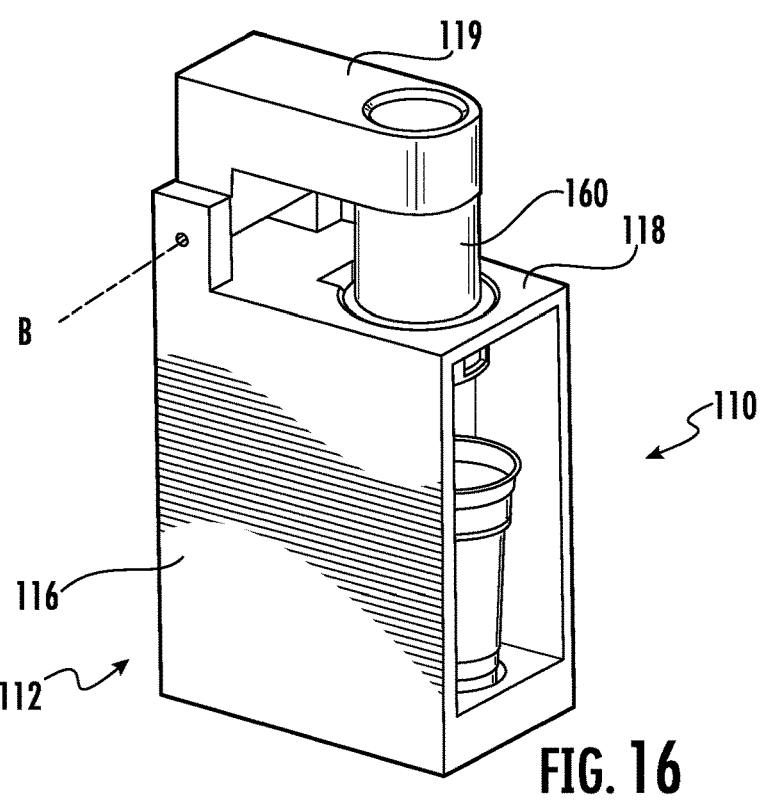
FIG. 16 is a front perspective view of a frothing appliance according to alternative embodiments of the invention, with the head of the frothing appliance shown in a lowered position.
Figure 17:
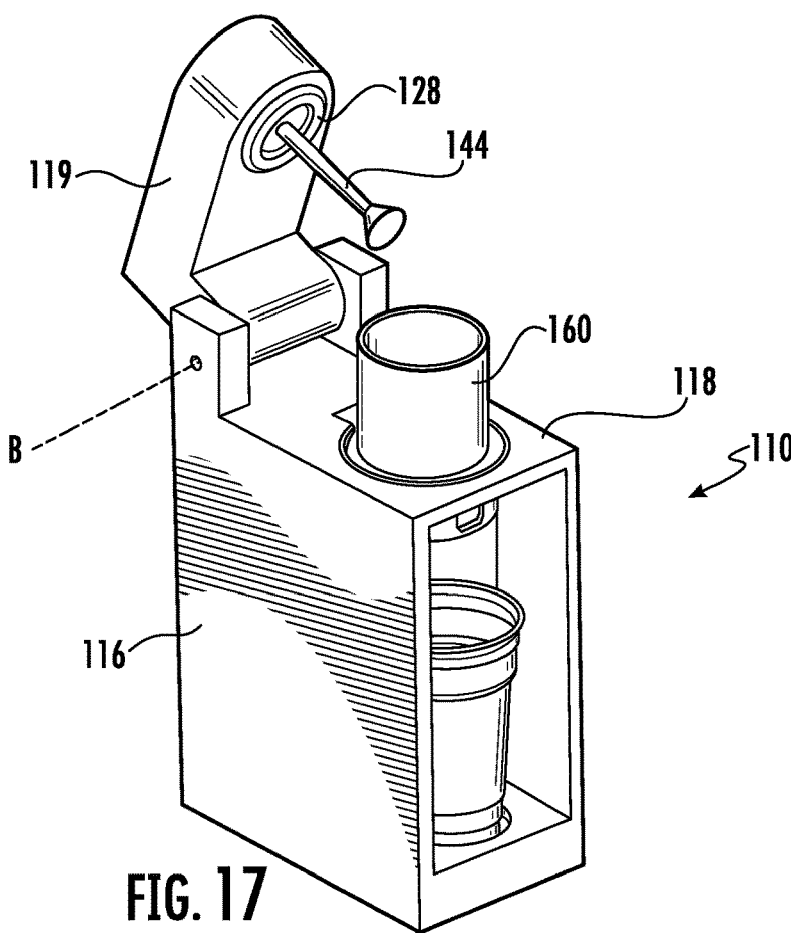
FIG. 17 is a front perspective view of the frothing appliance of FIG. 16, with the head shown in a raised position.

As a still further variation, FIGS. 16 and 17 illustrate a frothing appliance 110 that employs a vessel 160 similar to the vessel 60. However, the frothing appliance 160 has a head 119 that is tiltable relative to the tower 116 of the housing 112. As can be seen in FIGS. 16 and 17, the head 119 can be pivoted about a pivot axis B relative to the tower 116. The motor (not shown), the shower head 128, and the frothing tool 144 are all mounted to the head 119 and pivot therewith. The vessel 160 is mounted in an opening in the canopy 118. Thus, loading and unloading of the vessel 160 differ from the steps described above, but after the vessel 160 is mounted on the canopy 118 and the head 119 is lowered to the position shown in FIG. 16, the frothing operation can proceed in the same manner described above.

Figure 18:
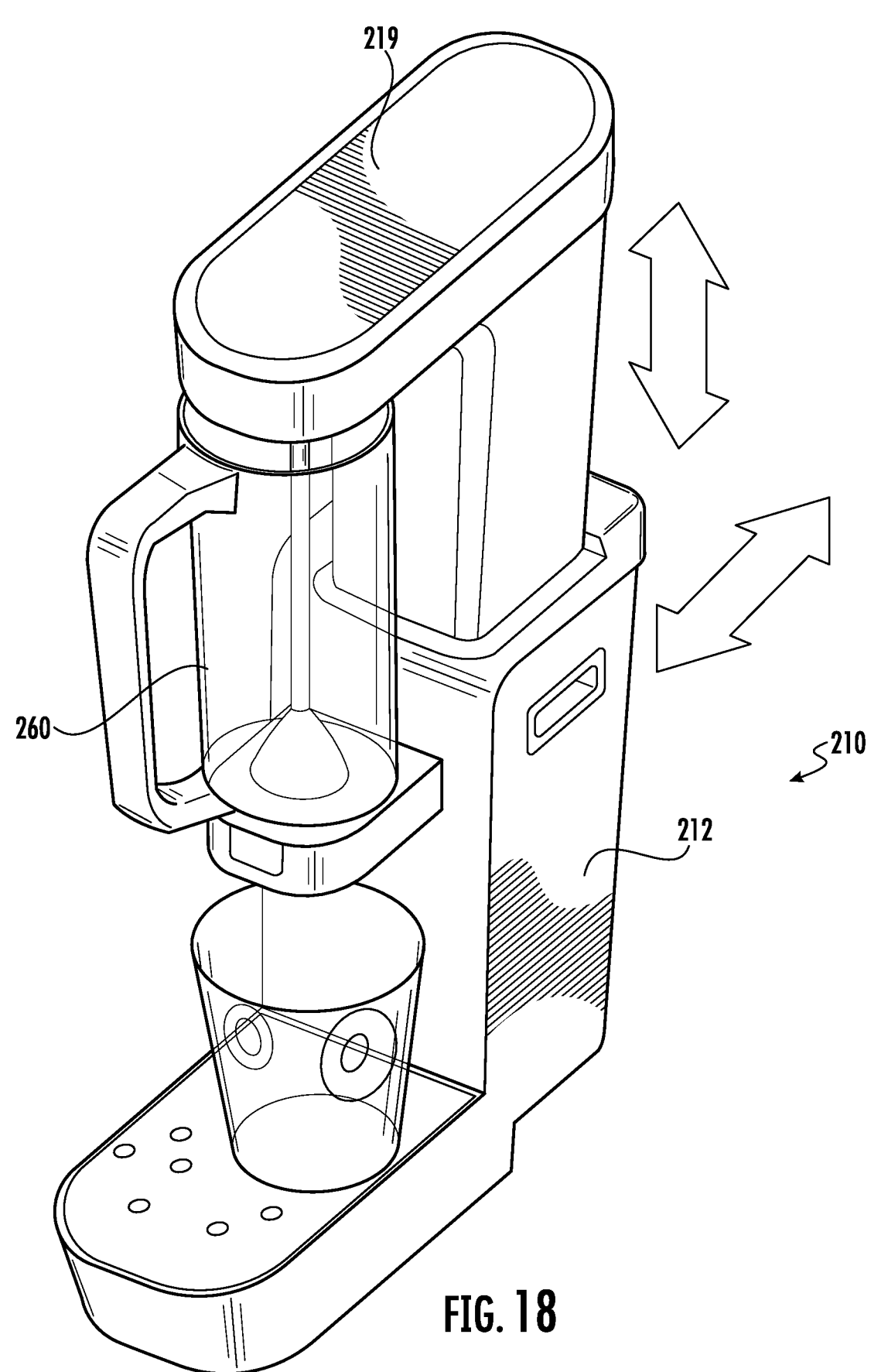
FIG. 18 is a front perspective view of a frothing appliance according to further embodiments of the invention.

A variation of the frothing appliance 110 is illustrated in FIG. 18 and designated at 210. In the frothing appliance 210, rather than the head pivoting to allow mounting and removal of the frothing vessel 260, the head 219 slides vertically relative to the housing 212.

Another embodiment of an automated self-cleaning frothing appliance, designated broadly at 310, is shown in FIGS. 19-23. The frothing appliance 310 is generally similar to the frothing appliance 10, but utilizes a different frothing vessel 360, and relies on a different variety of valve (i.e., a poppet valve 380) to control draining of foam and liquid from the frothing vessel 360. These components are described below.

Referring to FIGS. 20-23, the frothing vessel 360 is oblong in cross-section, with a side wall 361 defining the oblong shape. An eccentric funnel 362 depends from the side wall 361, such that its lower end 363 is offset toward the front end of the frothing vessel 360. An outlet 364 extends from the lower end 363 and is positioned above the cupholder 322.

Figures 22, 23:
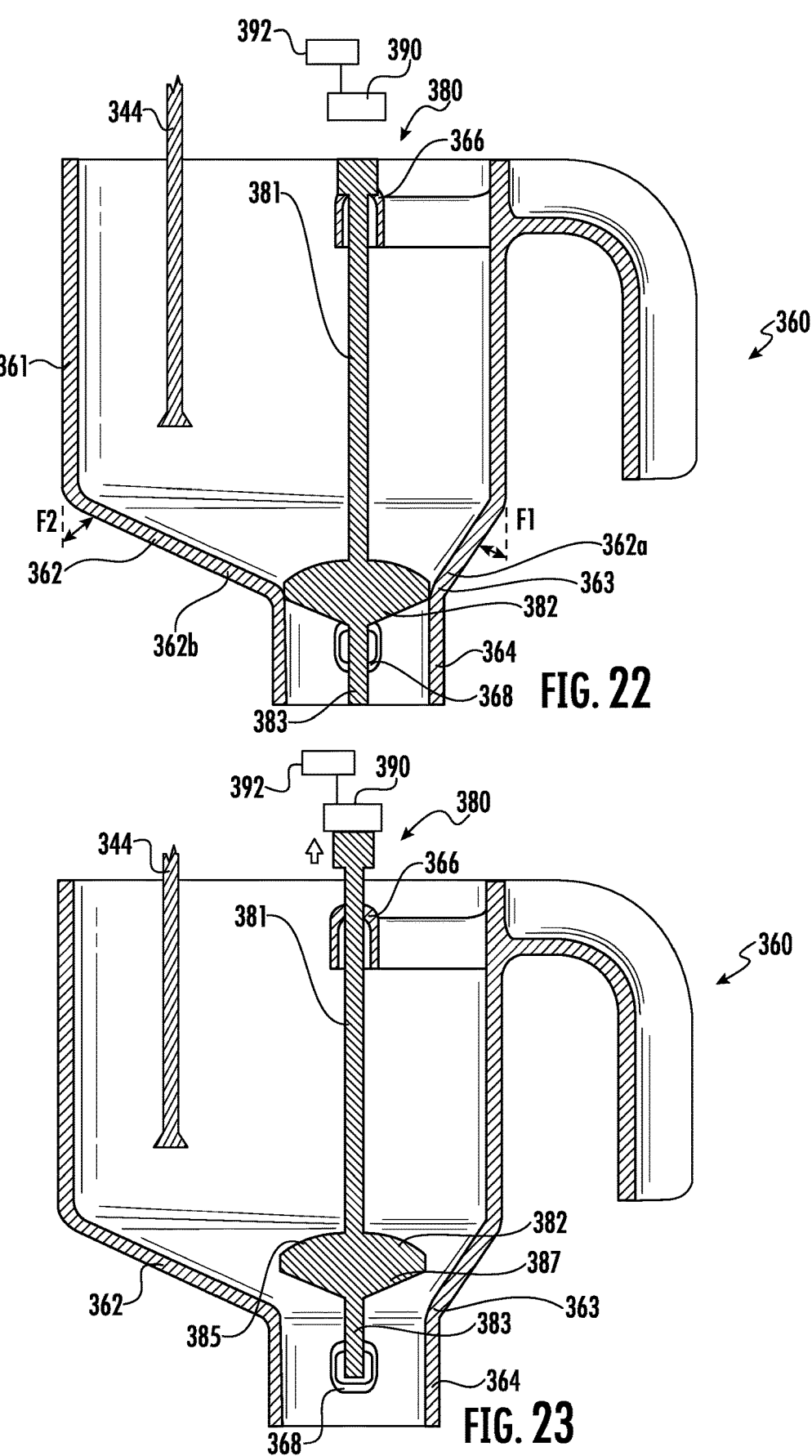
FIG. 22 is a side section view of the frothing vessel of FIG. 20, with the poppet valve in the closed position.
FIG. 23 is a side section view of the frothing vessel of FIG. 20, with the poppet valve in the open position.

As shown in FIG. 22, the front wall 362*a* of the funnel 362 defines an angle F1 relative to vertical, wherein F1 is typically between about 40 and 60 degrees. The rear wall 362*b* of the funnel 362 defines an angle F2 relative to vertical, wherein F2 is typically between about 20 and 40 degrees. The outlet 364 typically has a diameter of between about 1.25 and 1.75 inches. The angles F1, F2 and the diameter of the outlet 364 are selected to encourage draining of foamed liquid from the frothing vessel 360.

As show in FIGS. 20-23, the poppet valve 380 includes an upper rod 381, a stopper 382, and a lower rod 383. The upper and lower rods 381, 383 are slidably received in upper and lower alignment framework 366, 368 of the frothing vessel 360 to ensure substantially vertical movement of the poppet valve 380. The stopper 382 is round (see FIG. 21), with a convex upper surface 385 and a conical lower surface 387. The stopper 382 is sized to fill and seal the outlet 364 of the frothing vessel 360.

Figure 20:
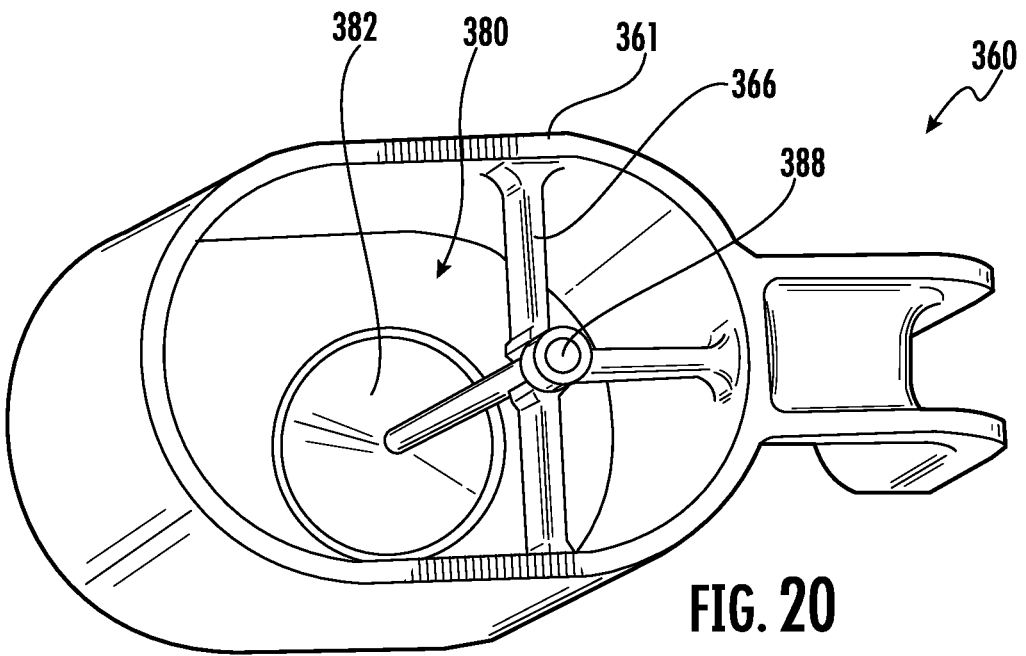
FIG. 20 is a top perspective view of the frothing vessel of the frothing appliance of FIG. 19.
Figure 21:
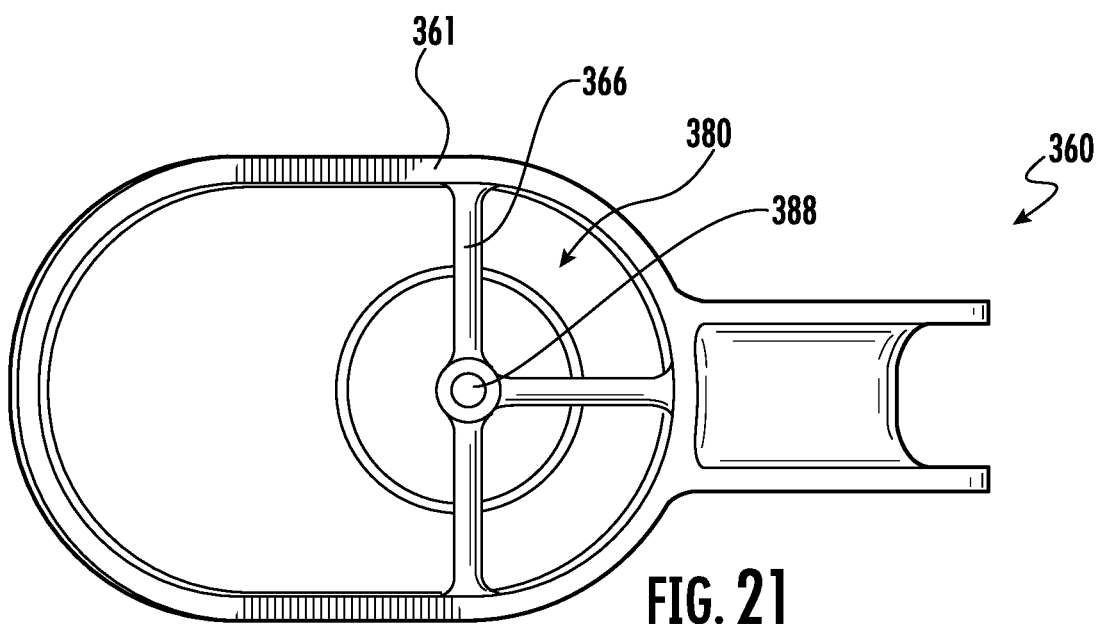
FIG. 21 is a top view of the frothing vessel of FIG. 20.

At its upper end, the poppet valve 380 includes a magnet 388 (FIGS. 20 and 21). A solenoid 390 (schematically shown in FIGS. 22 and 23) is located above the magnet 388 in the canopy 318 of the housing 312 of the frothing appliance 310 and acts as a valve-opening mechanism. The solenoid 390 is connected to the controller 392. As can be envisioned from FIGS. 22 and 23, When the solenoid 390 is not energized, gravity causes the poppet valve 380 to take a lowered position (FIG. 22), in which the stopper 382 seals the outlet 364 and prevents liquid from draining from the frothing vessel 360. Energizing the solenoid 390 via the controller 392 attracts the magnet 388 of the poppet valve 380 and draws it upwardly (FIG. 23), which opens the outlet 364 of the frothing vessel 360 and allows foam and/or liquid to drain therefrom.

FIGS. 21 and 22 schematically show a frothing tool 344 that may be similar in structure and function to the frothing tool 44 described above; however, the frothing tool 344 is positioned to reside in the rear portion of the frothing vessel 360 to avoid interference with the poppet valve 380.

Figure 19:
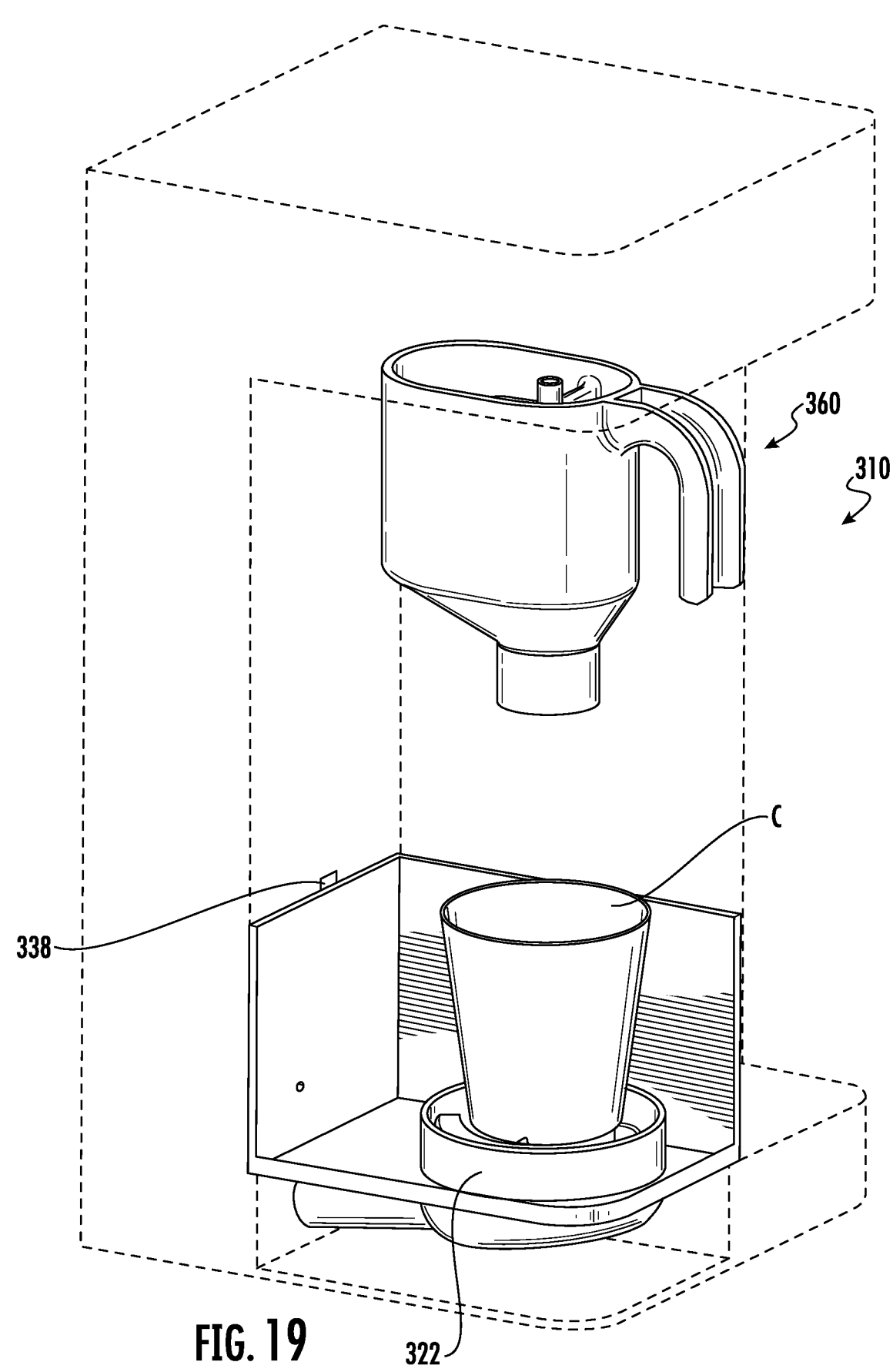
FIG. 19 is a perspective view of a frothing appliance according to additional embodiments of the invention.

Operation of the frothing appliance 310 follows a sequence similar to that of the other frothing appliances 10, 110, 210 described above. In operation, a user (such as a barista working in a coffee shop) disengages the frothing vessel 360 and poppet valve 380 from the appliance 310 to fill the vessel 360 with the ingredients to be frothed. The poppet valve 380 is in its lowered position. The vessel 360 is replaced on the appliance 310. The user places a cup C in the cupholder 322 (where it can be detected by the cup sensor 338 (FIG. 19). The user then activates the appliance 310 and, because the cup sensor 338 detects the presence of a cup, the ingredients in the frothing vessel 360 are frothed.

Once frothing is complete, the controller 392 signals the solenoid 390 to actuate, which attracts the magnet 388 of the poppet valve 380 and draws the poppet valve 380 into the raised position (FIG. 23) to open the outlet 364. Foamed liquid in the vessel 360 is free to drain from the frothing vessel 360 through the funnel 362 and outlet 364 into the cup C below.

Once the frothed liquid has flowed into the cup C, the user may remove the cup C (which now has a frothed head atop the beverage therein) from the cupholder 322. Removal of the cup C is detected by the cup sensor 338, which signals the controller 392 to activate the water source to provide water along a fluid pathway to the vessel 360 in the manner described above. With the poppet valve 380 in the raised position, water sprayed into the vessel 360 rinses the vessel 360 and drains through the outlet 364 drains into the cupholder 322, and then drains to an external waste water receptacle through a fluid pathway. This action can provide automated cleaning of the vessel 360. After a preselected duration (e.g., 2 to 5 seconds), the controller 392 deactivates the solenoid 390, which causes the poppet valve 380 to descend (via gravity) to its lowered position. Water continues to flow into the closed vessel 360 until it is partially filled. The controller 392 then rotates the frothing tool 344 to agitate the water in the vessel 360 for more thorough cleaning, after which the controller 392 deactivates the frothing tool 344 and actuates the solenoid 390 again, causing the poppet valve 380 to rise to allow the water from the second rinsing to drain into the cupholder 322 and out of the appliance 310. After a preselected duration (e.g., 2 to 5 seconds), the controller 392 deactivates the solenoid 390 to allow the poppet valve 380 to descend to the lowered position. At this point the appliance 310 is ready to perform another frothing operation.

Those of skill in this art will appreciate that the frothing appliance 310 may take other forms. For example, the poppet valve 380 may be replaced with a valve of a different form, such as a pivoting gate valve. The valve 380 may be driven by a different valve-opening mechanism (e.g., a linkage may be employed to raise and lower the valve). The valve 380 may be configured to be spring-loaded toward the closed position (rather than relying on gravity alone to bias the valve toward the lowered position). Other variations may also be suitable for use with embodiments of the invention.

Referring now to FIGS. 24 and 25A-C, another frothing appliance, designated broadly at 410, is shown therein. The frothing appliance 410 is similar to the appliance 310 described above, with the exception that cupholder 420 has the capability of being positioned at three different elevations: a lowered position (FIGS. 24 and 25A) for dispensing foam into a large cup; an intermediate position (FIG. 2B) for dispensing foam into a smaller cup; and a raised position (FIG. 25C) for rinsing the frothing vessel 460 after dispensing.

As shown in FIGS. 24 and 25A-C, the tower 414 of the housing of the appliance 410 includes a vertical slot 417. A drainage segment 424 of the cupholder 420 extends through the vertical slot 417. A drainage basin 425 is located within the tower 416. The drainage basin 425 includes an inclined floor 427 that slopes toward the drain line 428. The drainage basin 425 also includes a tall rear wall 429 with shields 431 extending forwardly from the side edges of the rear wall 429. Thus, it can be envisioned that, as the cupholder 420 and drainage segment 424 rise and descend, the rear wall 429 and shields 431 are located so that water exiting the drainage segment 424 will be captured by the drainage basin 425 and directed to the inclined floor 427, from where it will drain out of the appliance 420 through the drain line 428. As such, a fluid pathway 432 is created that may include the cupholder 420, the drainage segment 424, the drainage basin 425, and the drain line 428.

In some embodiments, the cupholder 420 may be manually movable between the lowered, intermediate and raised positions. A manually movable cupholder 420 may have a drainage segment 424 that includes features (latches, fingers or the like) that interact with mating features on the wall of the tower 414 (not shown) to enable the cupholder 420 to be mounted at the various elevations. As such, sliding the cupholder 420 and drainage segment 424 vertically within the slot 417 can enable the user to move the cupholder 420 to the desired elevation for dispensing, then move it again for rinsing when dispensing is complete. In some embodiments, the appliance 410 may include a "fail-safe" switch or the like that prevents the rinsing operations from occurring unless the cupholder 420 is in the raised position.

Alternatively, the frothing appliance 410 may include a mechanism connected to the controller (not shown) that automatically raises and lowers the cupholder 420 to the desired position. Such a mechanism may include, for example, a linear actuator that has a rail fixed to the tower 414 and a carriage that is slidable on the rail. The carriage may be fixed to the drainage segment 424. The controller may be operatively connected with the linear actuator to automatically drive the drainage segment 424 and cupholder 420 between the lowered, intermediate and raised positions to perform the dispensing and rinsing functions as discussed above.

Figure 24:
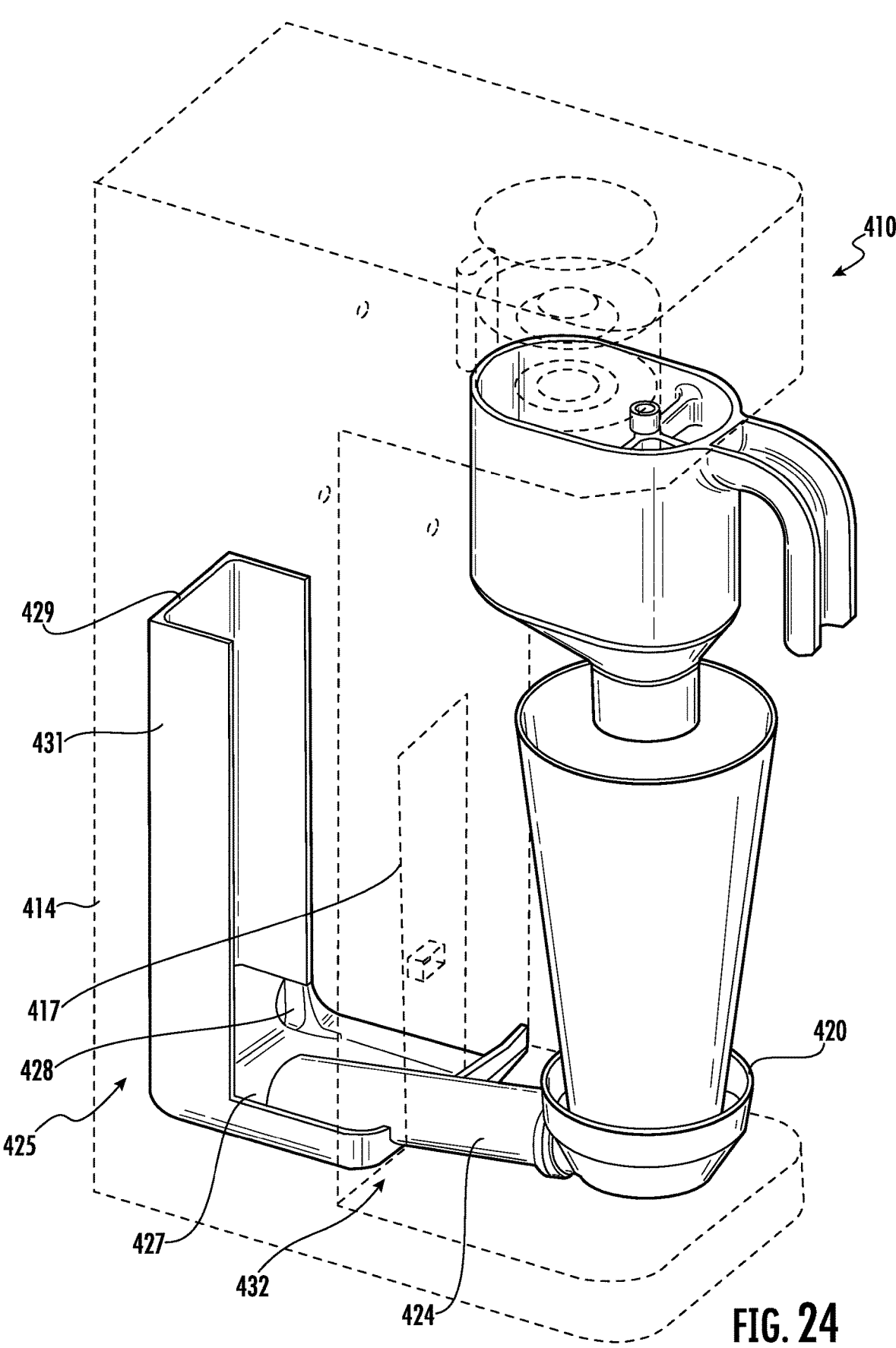
FIG. 24 is a perspective view of a frothing appliance according to further embodiments of the invention.
Figures 25A, 25B, 25C:
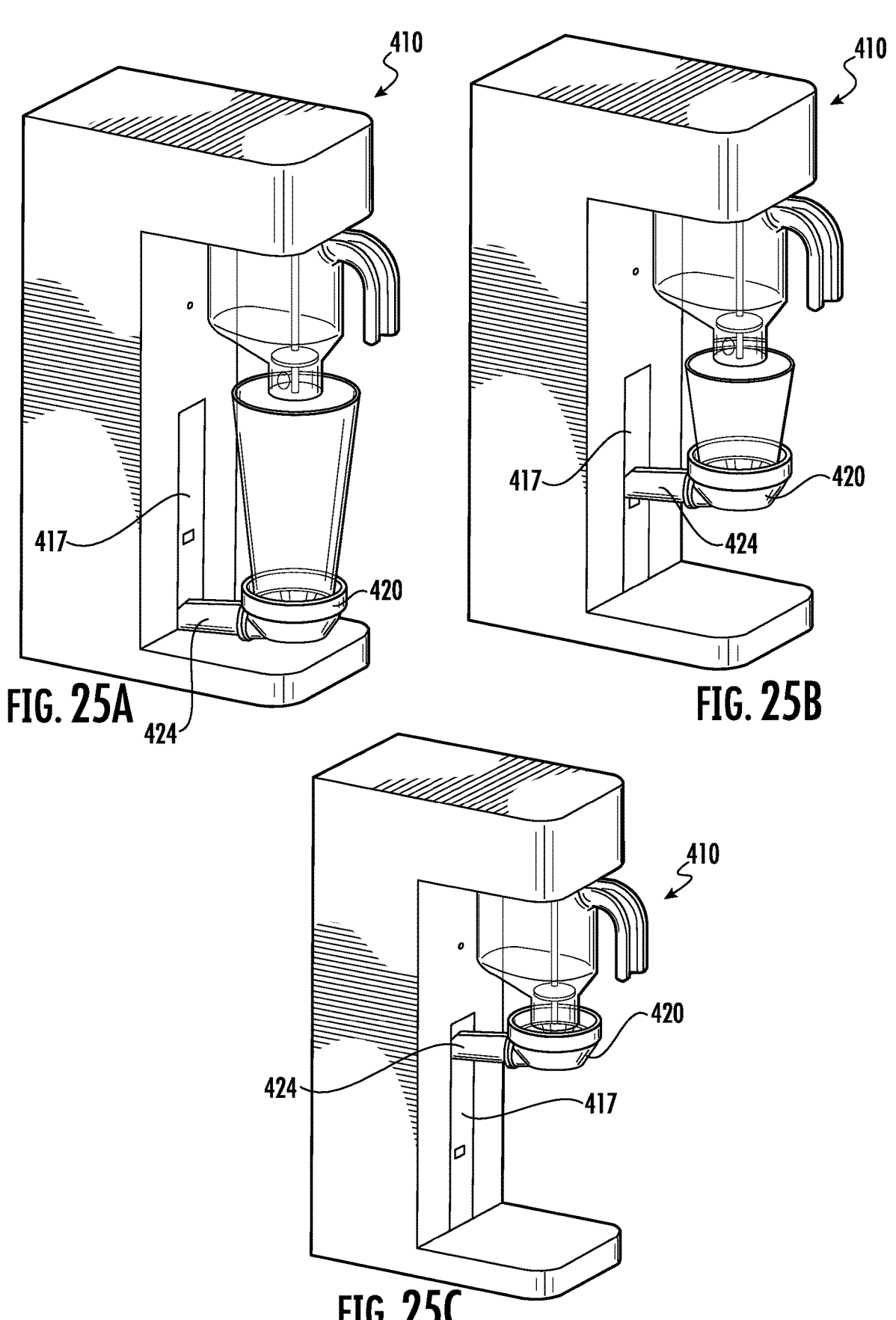
FIGS. 25A-C are perspective views of the frothing appliance of FIG. 24, with the cupholder shown in lowered, intermediate and raised positions.

A frothing appliance that includes both a poppet valve as shown in FIGS. 19-23 and a liftable cupholder as in FIGS. 24-25C is shown in FIGS. 26-31B and designated broadly at 510. The cupholder (referred to herein as a cupholder) 520 is movable via a cupholder lifting mechanism 540 to any height/elevation between a lowered position (FIGS. 27A, 28A and 28B) and a raised position (FIGS. 27C and 28D). The lift mechanism 540 is described in detail below.

Figure 26:
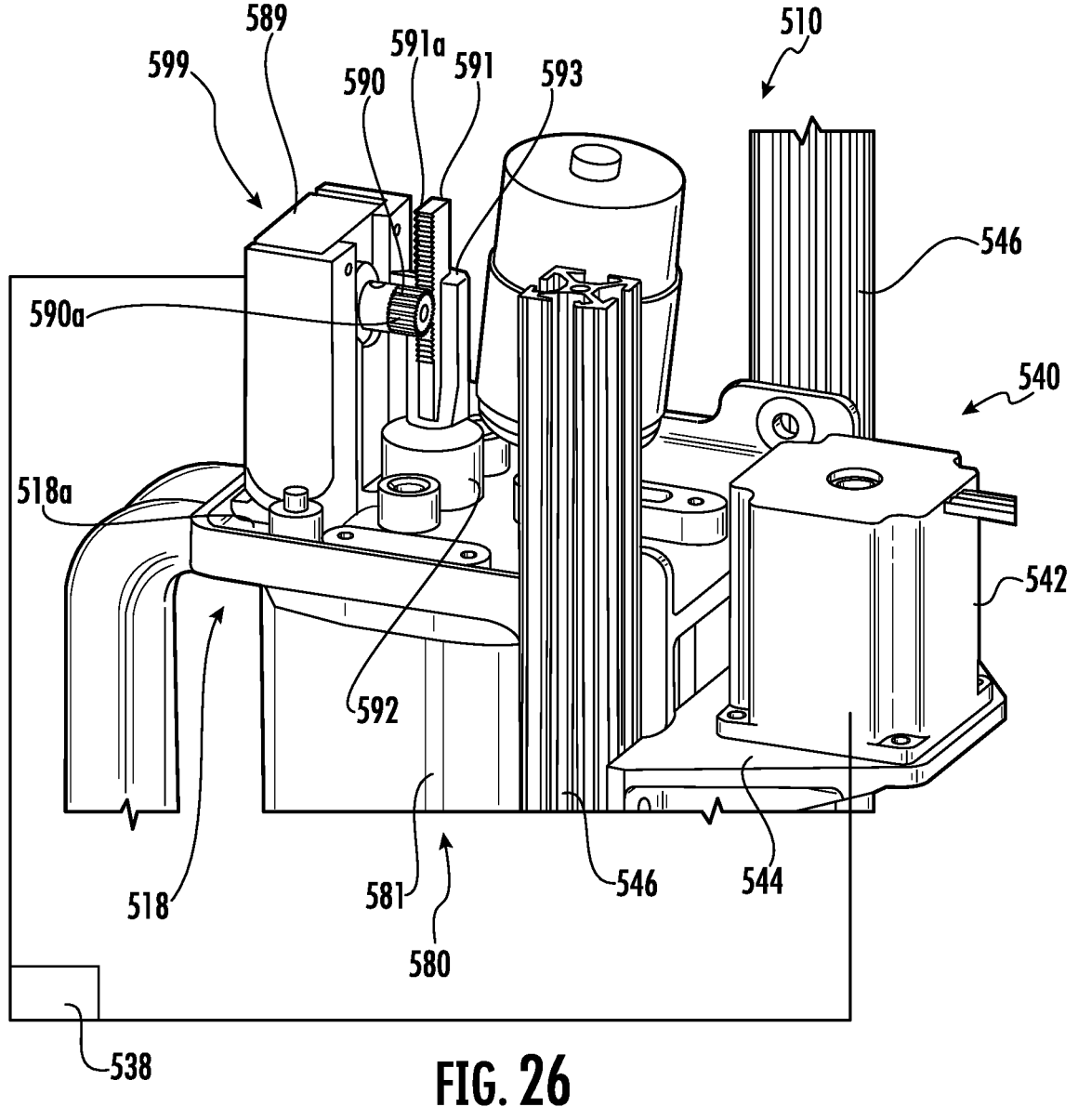
FIG. 26 is a partial top, rear perspective view of a drive unit for a frothing appliance, wherein the drive unit raises and lowers the cupholder according to embodiments of the invention.
Figure 27A:
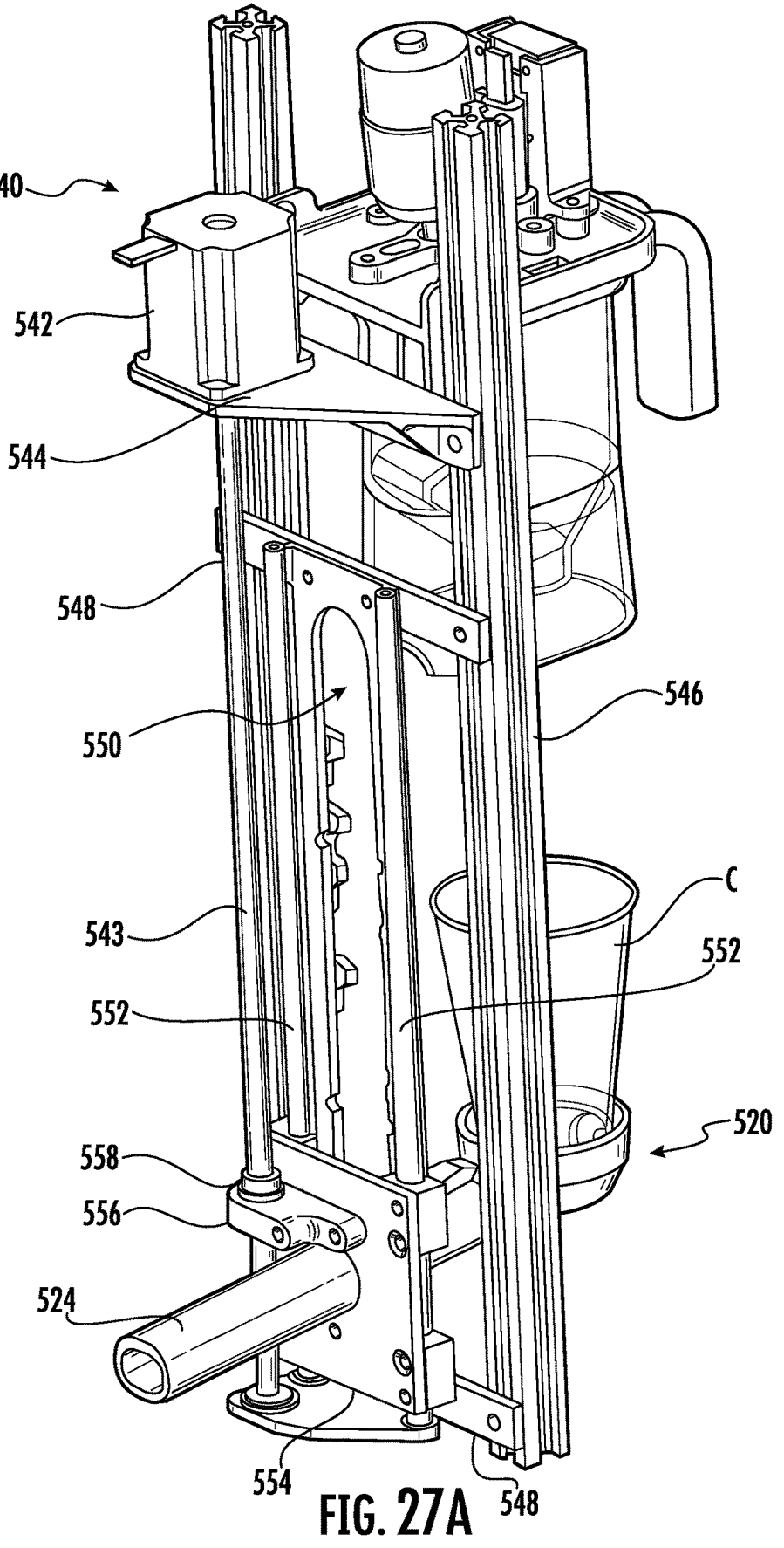
FIGS. 27A-27C are rear perspective views of the drive unit and cupholder of FIG. 26 in lowered, intermediate and raised positions.
Figure 27B:
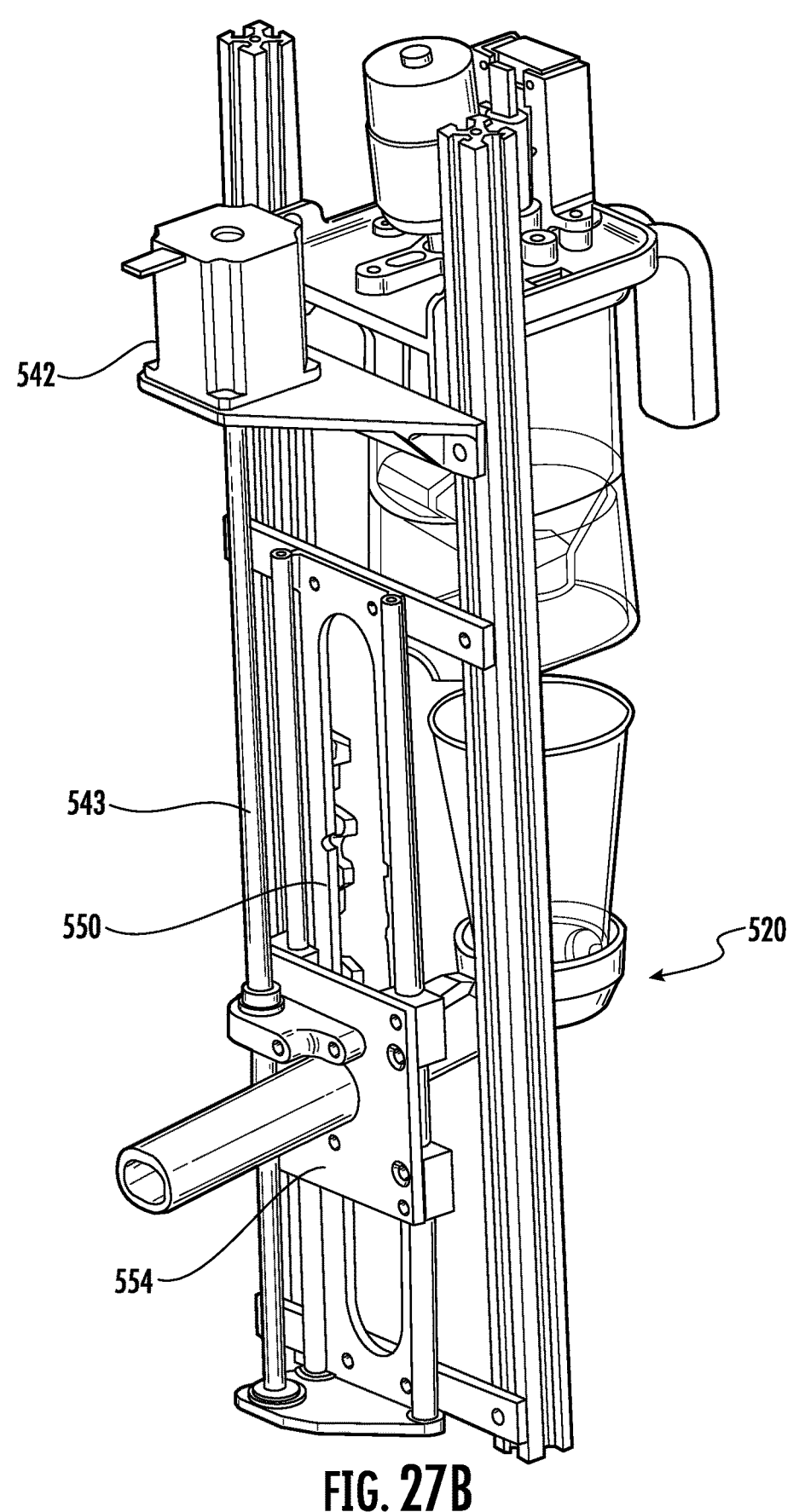
Figure 27C:
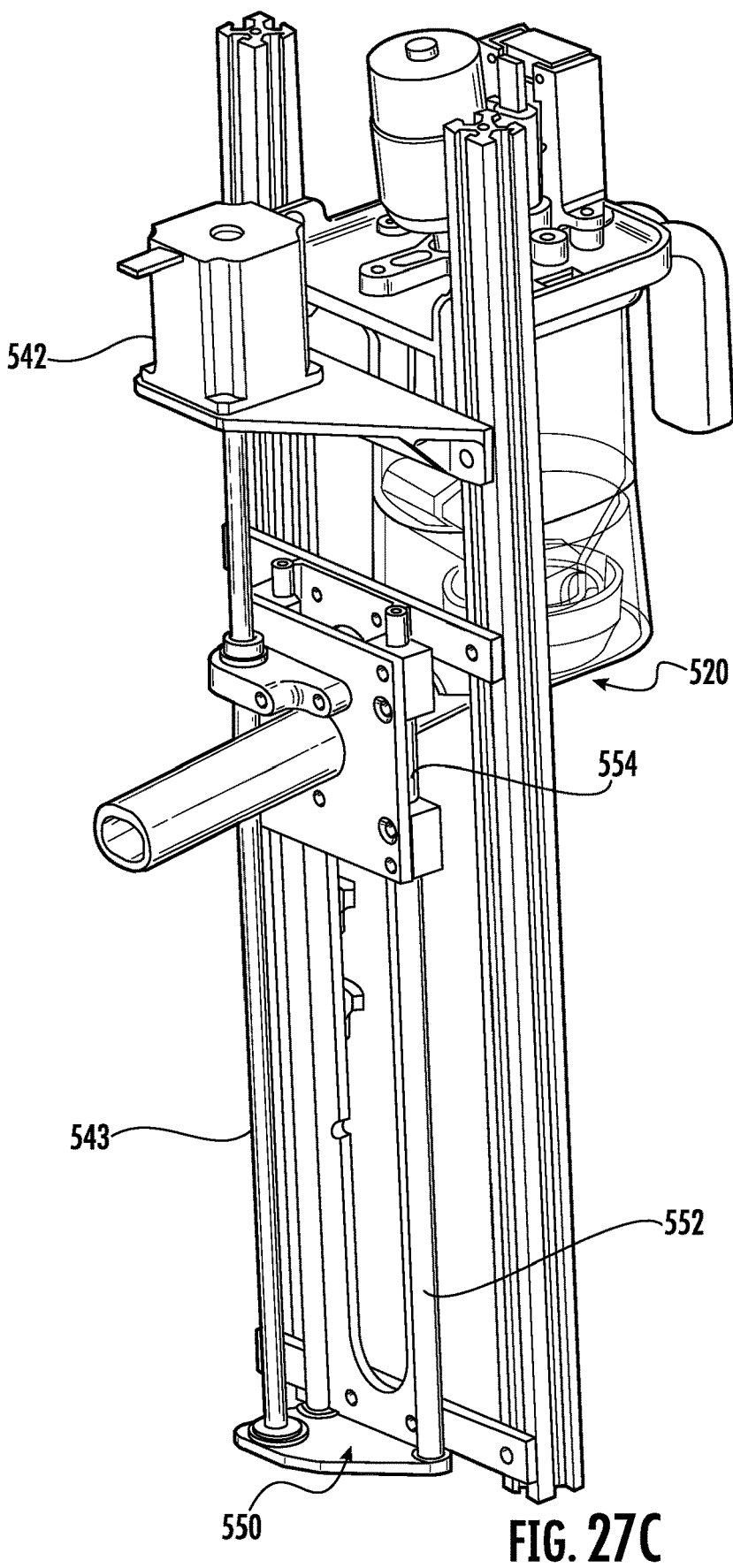

Referring to FIGS. 26 and 27A, the cupholder lifting mechanism 540 includes a motor 542 mounted on a stationary platform 544. The platform 544 is mounted near the upper ends of two upright supports 546. The supports 546 are spanned by two braces 548. A slide member 550 with two rails 552 is fixed to the braces 548. A carriage 554 is slidably mounted on the rails 552. The cupholder 520 is mounted via its drainage segment 524 to the carriage 554. A bearing block 556 with a threaded nut 558 fixed thereto extends rearwardly from the carriage 554. A threaded shaft 543 extends from the motor 542 through the nut 558 and bearing block 556. Thus, when the motor 542 rotates the shaft 543, such rotation drives the carriage 554 and the cupholder 520 up and down, with the carriage 554 sliding along the rails 552 of the slide member 550.

Figure 28A:
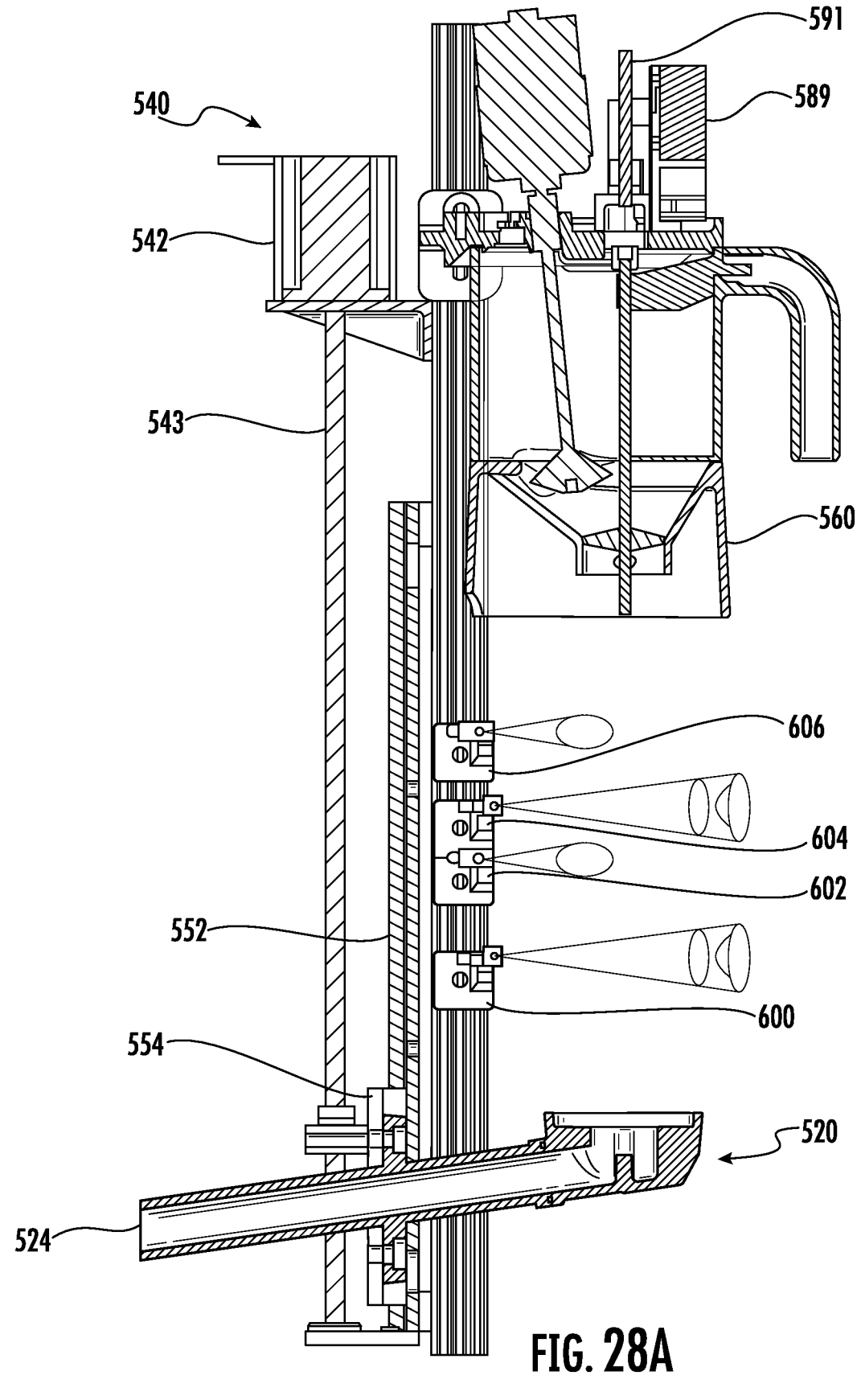
FIGS. 28A-28D are side views of the drive unit and cupholder of FIGS. 27A-27C shown in lowered (FIGS. 28A and 28B), intermediate (FIG. 28C) and raised (FIG. 28D) positions.
Figure 28B:
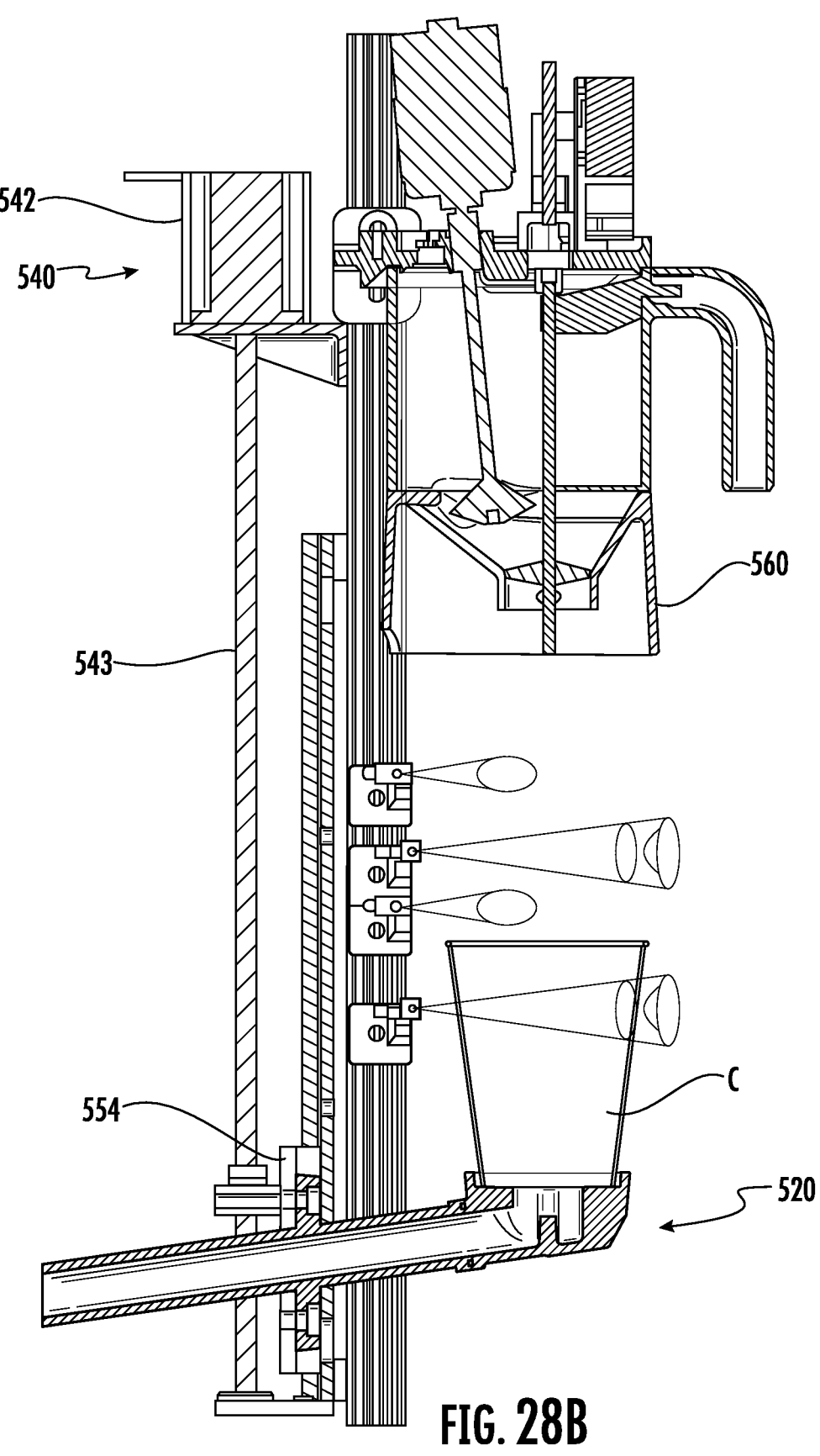
Figure 28C:
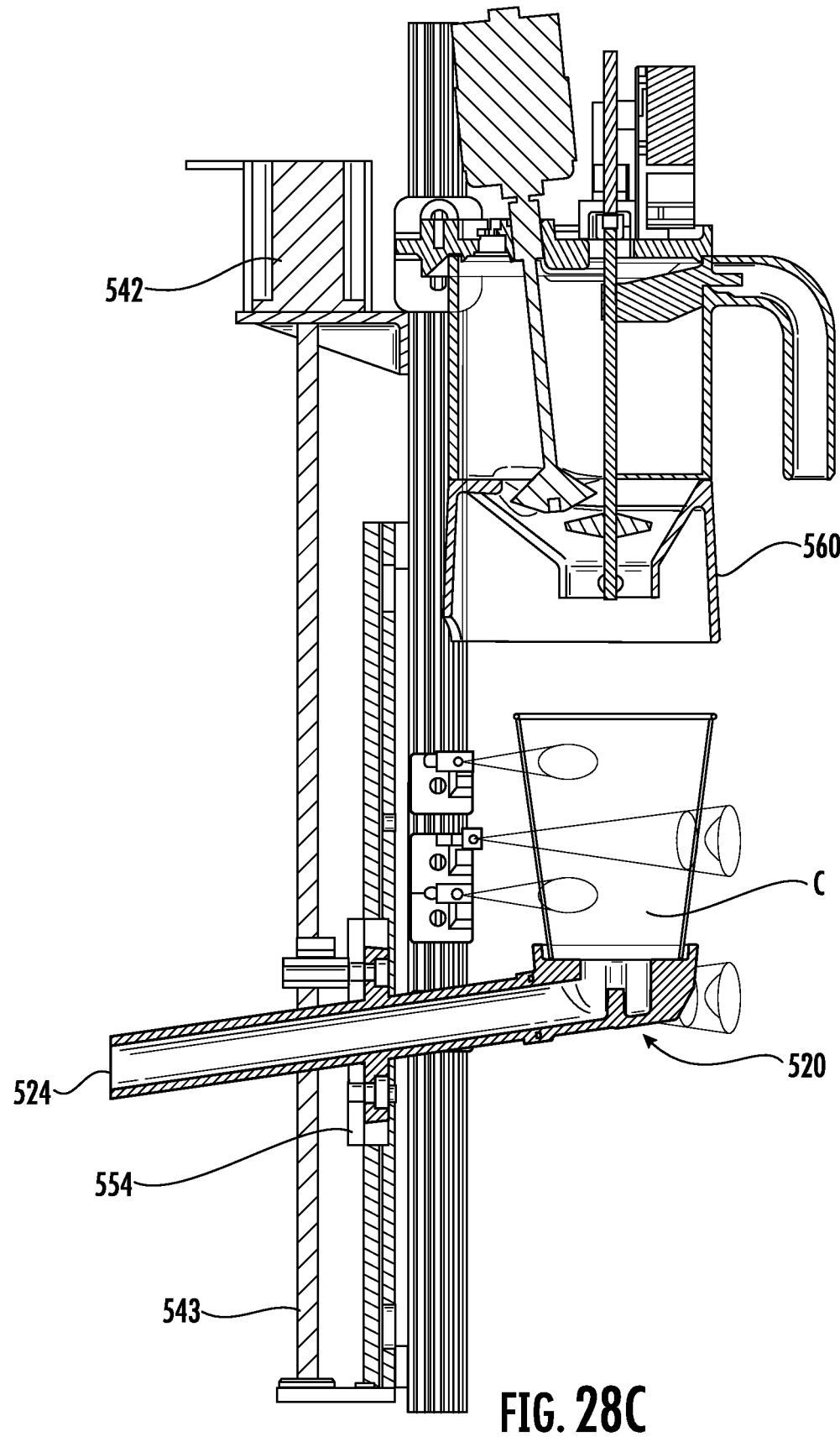
Figure 28D:
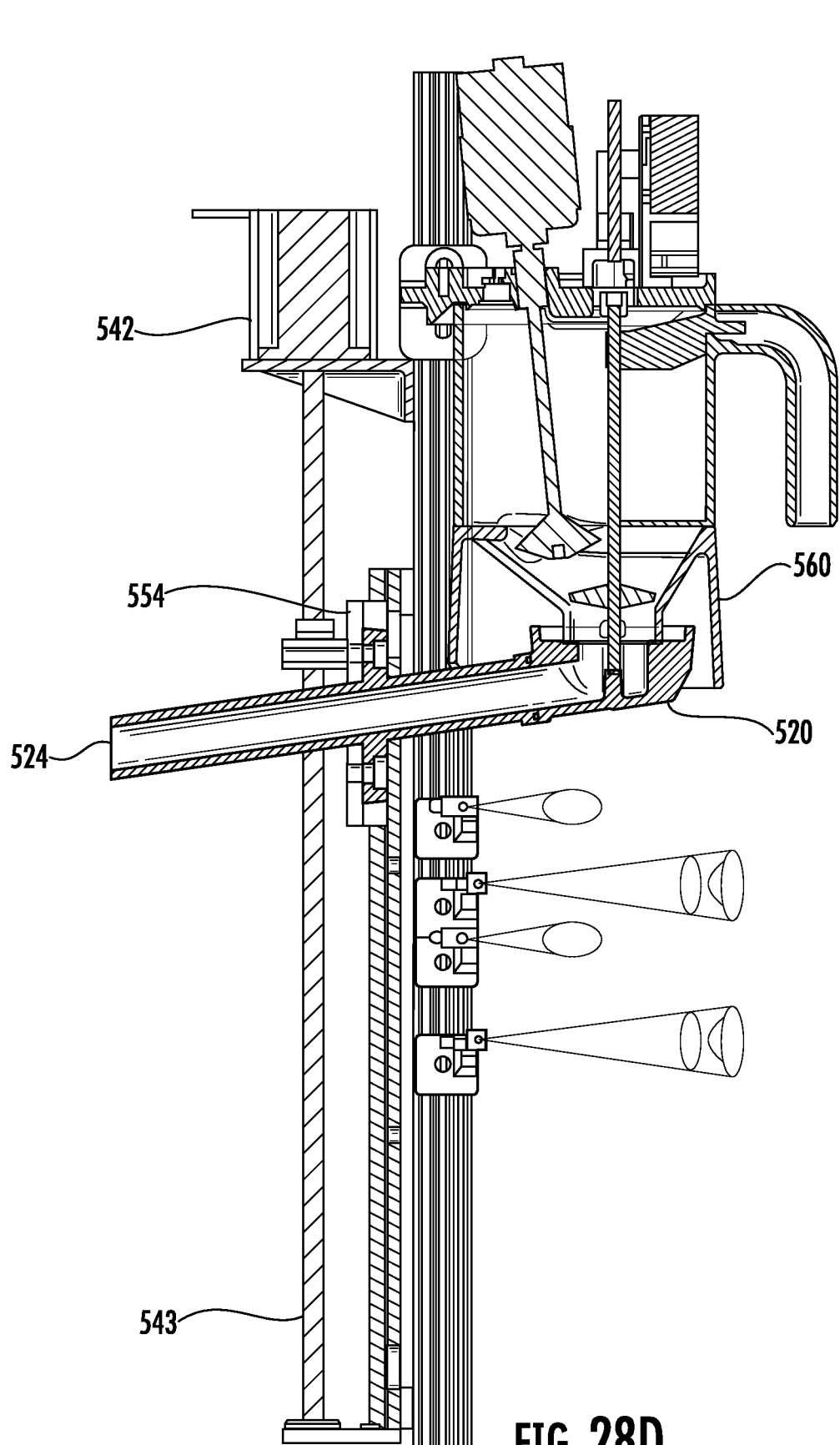

Referring to FIGS. 27A-27C and 28A-28D, the cupholder 520 may be driven by the motor 542 (controlled by a controller 538 shown schematically at FIG. 26) between a lowered position, such as that shown in FIG. 28A (with no cup present in the cupholder 520) and FIGS. 27A and 28B (with a cup C present in the cupholder 520), and an infinite number of raised positions. Exemplary raised positions include those shown in FIGS. 27B and 28C (which show a potential elevation of the cupholder 520 and small cup for dispensing of foam), and in 27C and 28D (which show a highly elevated position for rinsing of the frothing vessel 560, the poppet valve 580 and the cupholder 520, described in greater detail below).

Referring now to FIG. 26 and to FIGS. 29A-29H, the poppet valve 580 and its manner of operation are shown therein. Similar to the poppet valve 380 described above, the poppet valve 580 has an upper rod 581, a stopper 582, and a lower rod 583. The upper and lower rods 581, 583 are slidably received in upper and lower alignment framework 566, 568 of the frothing vessel 560 to ensure substantially vertical movement of the poppet valve 580. The stopper 582 is round, with convex upper and lower surfaces 585, 587. The stopper 582 is sized to fill and seal the outlet 562 of the frothing vessel 560. At its upper end, the poppet valve 580 includes a magnet 588 encircled by a shoulder 586.

Referring to FIG. 26, a valve-opening mechanism 599 includes a motor 589 with a shaft 590 having teeth 590a mounted to the floor 518a of the canopy 518. A toothed bar 591 with teeth 591a engages the teeth 590a of the shaft 590 and extends generally vertically through a hole 594 in a raised hollow boss 592 in the floor 518a (see also FIG. 29A). A guide 593 is positioned to support and guide the side edge of the toothed bar 591 opposite the shaft 590; the guide 593 enables the bar 591 to slide vertically relative to the motor 589 and floor 518a.

Figure 29A:
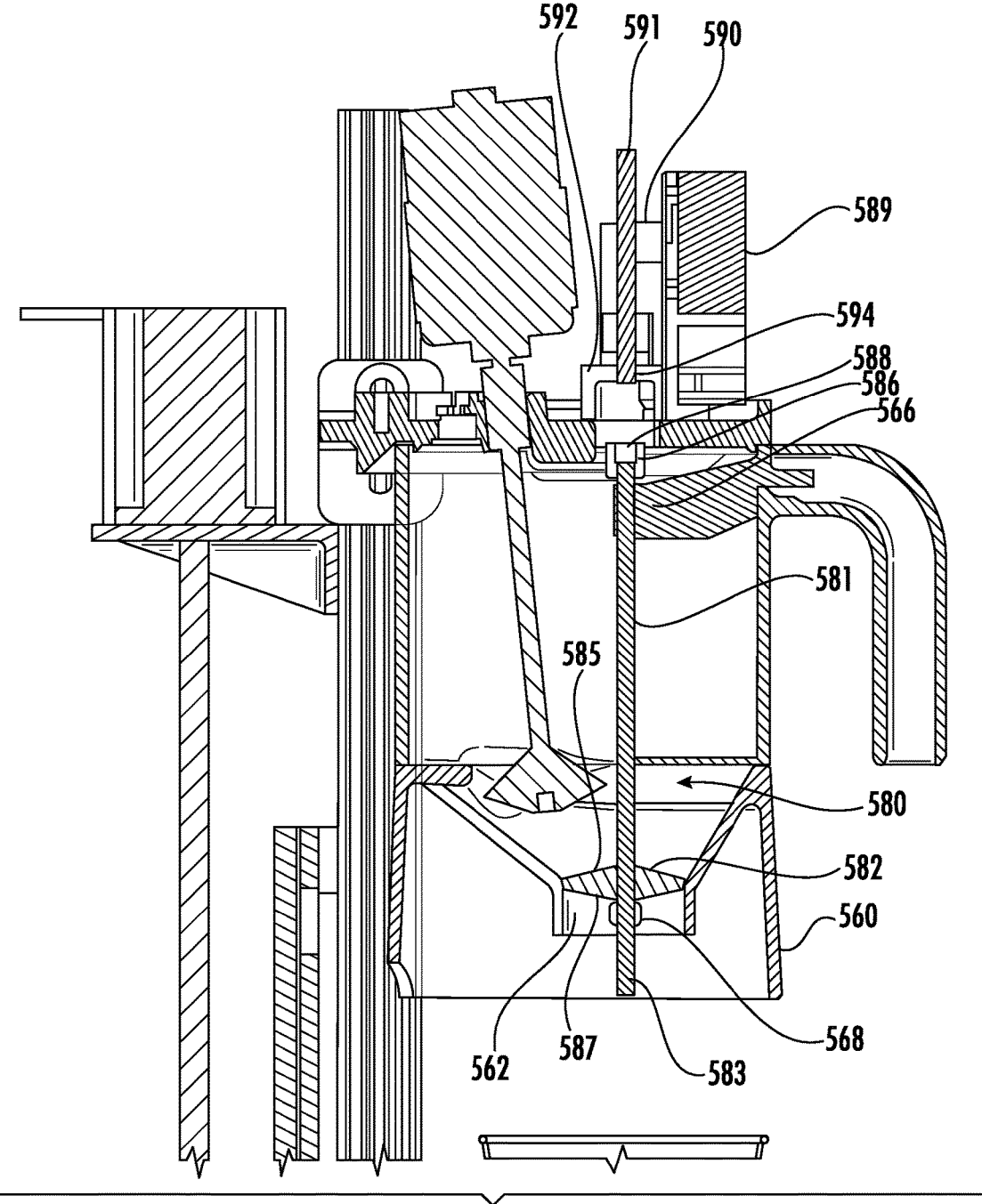
FIGS. 29A-H are side views of the poppet valve and its lift mechanism according to embodiments of the invention.
Figure 29B:
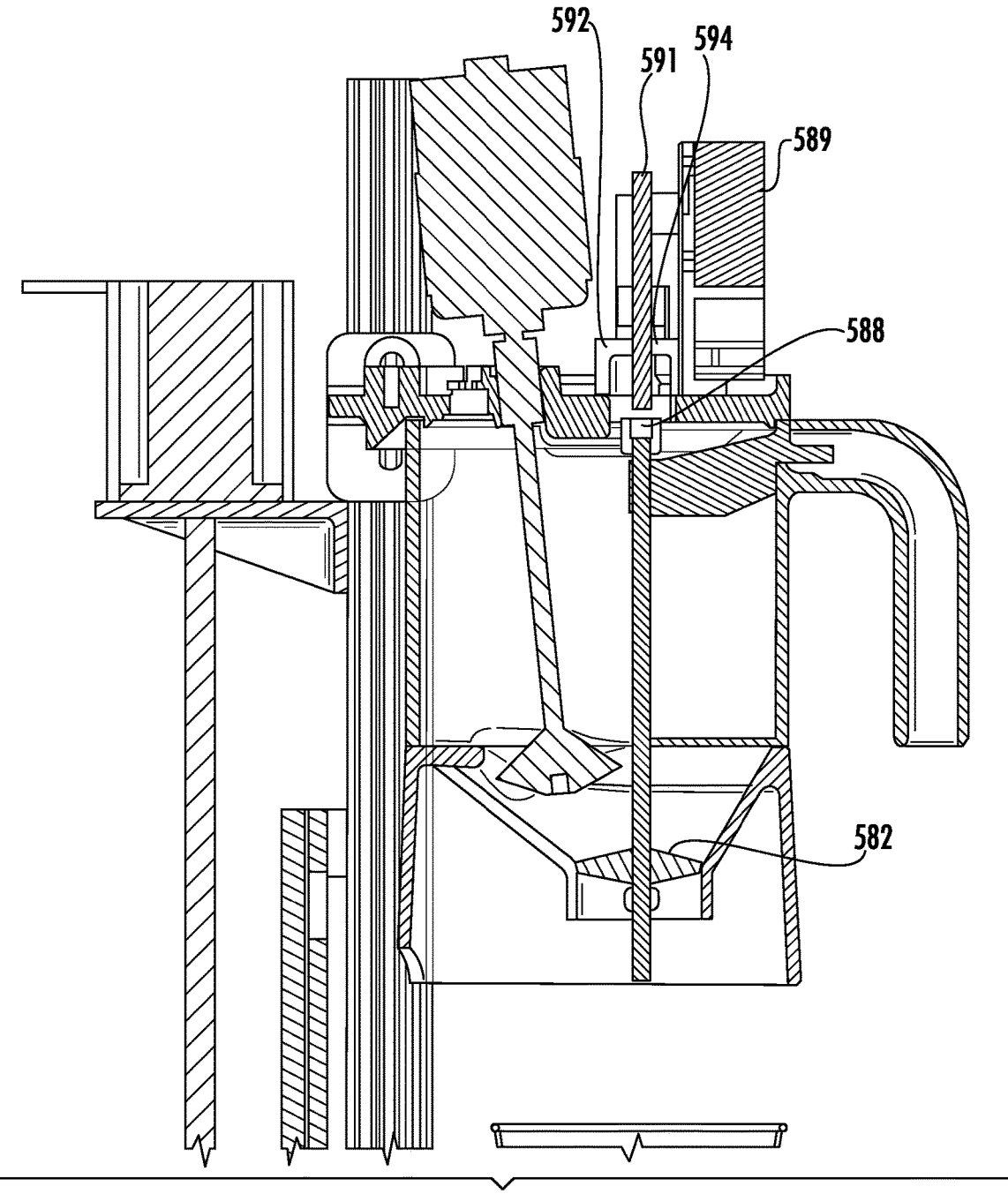
Figure 29C:
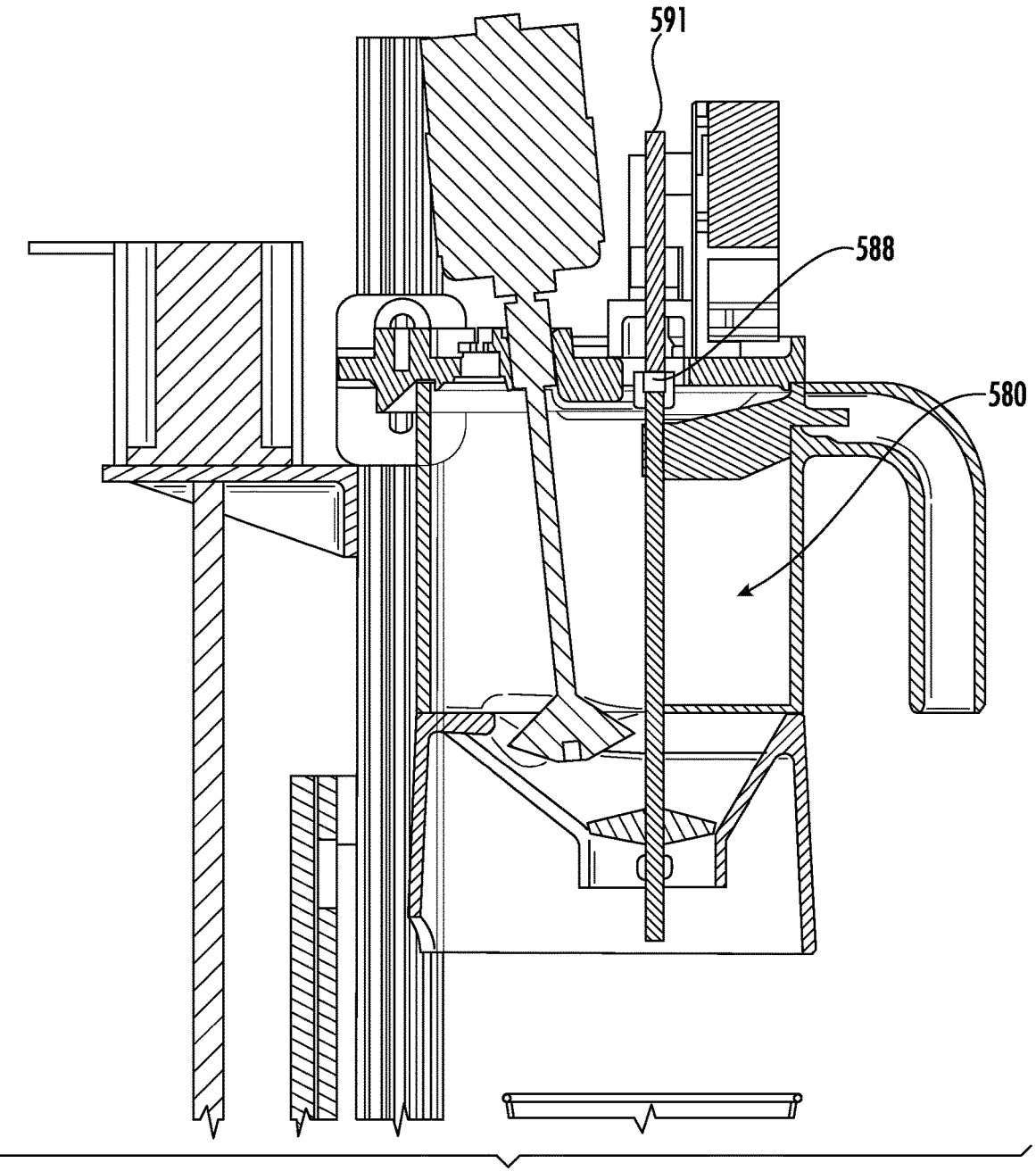
Figure 29D:
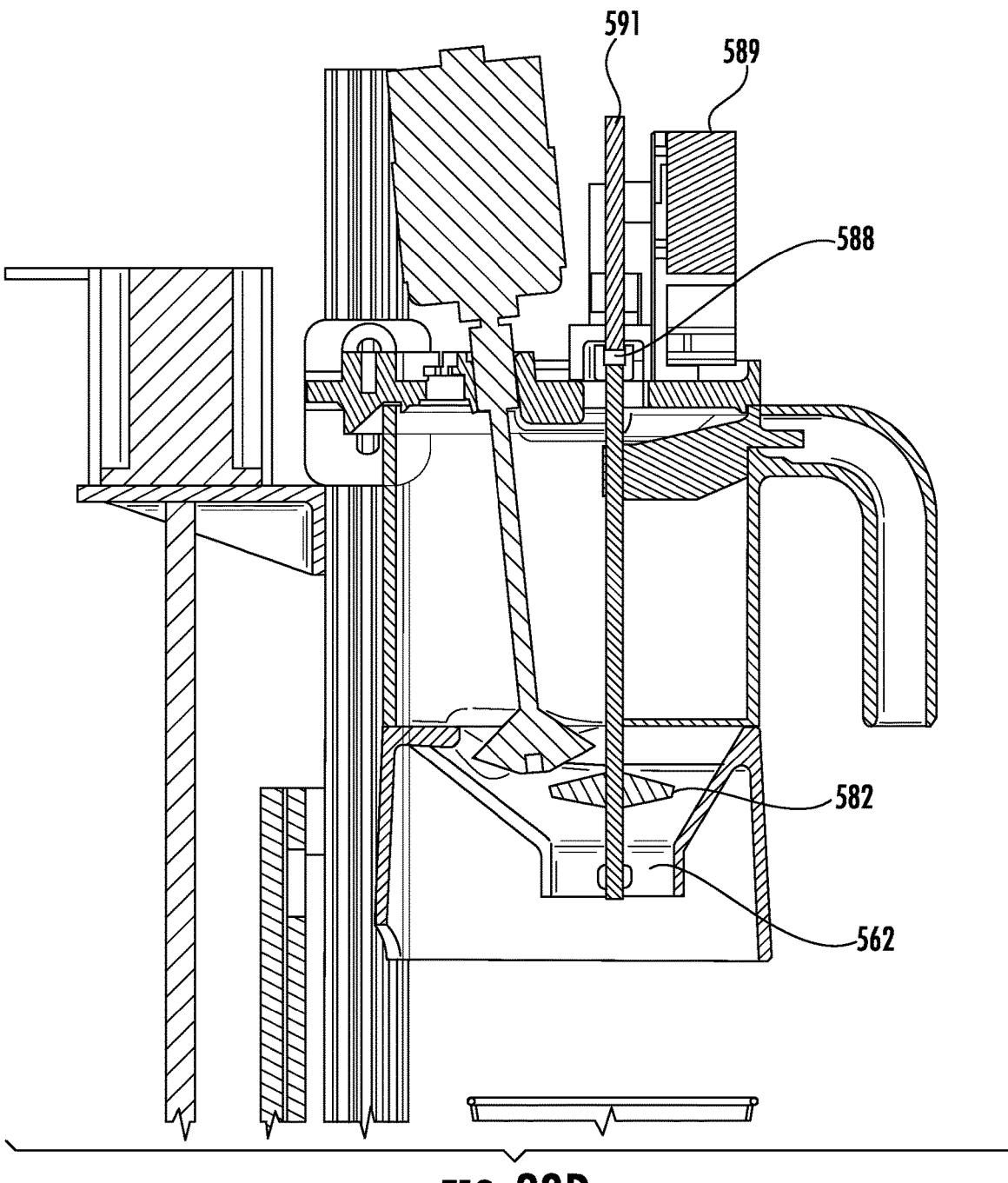

Operation of the poppet valve 580 during frothing and rinsing operations can be understood with reference to FIGS. 29A-29H. FIG. 29A shows the poppet valve 580 in a lowered position within the vessel 560 so that the stopper 582 is positioned in the outlet 562 of the vessel 560. Filling of the vessel 560 with ingredients and frothing occur in this position. The motor 589 (controlled by the controller 538) maintains the toothed bar 591 in a raised position. When frothing is complete, the motor 589 rotates the shaft 590 to drive the toothed bar 591 downwardly through the hole 594 in the raised boss 592 (FIG. 29B). As the lower end of the toothed bar 591 approaches the magnet 588 at the upper end of the poppet valve 380, the magnet 588 is attracted to the toothed bar 591, causing the poppet valve 380 to rise and stick to the lower end of the toothed bar 591 (FIG. 29C). The motor 589 then drives the toothed bar 591 and the attached poppet valve 580 upwardly, thereby drawing the stopper 582 from the outlet 562 and allowing foam to drain through the outlet 562 into a cup positioned beneath the outlet 562 on the cupholder 520 (FIG. 29D). The gap between the stopper 582 and the outlet 562 is relatively large (e.g., ½ to ¾ inch) to permit foam to drain from the outlet 562.

Figure 29E:
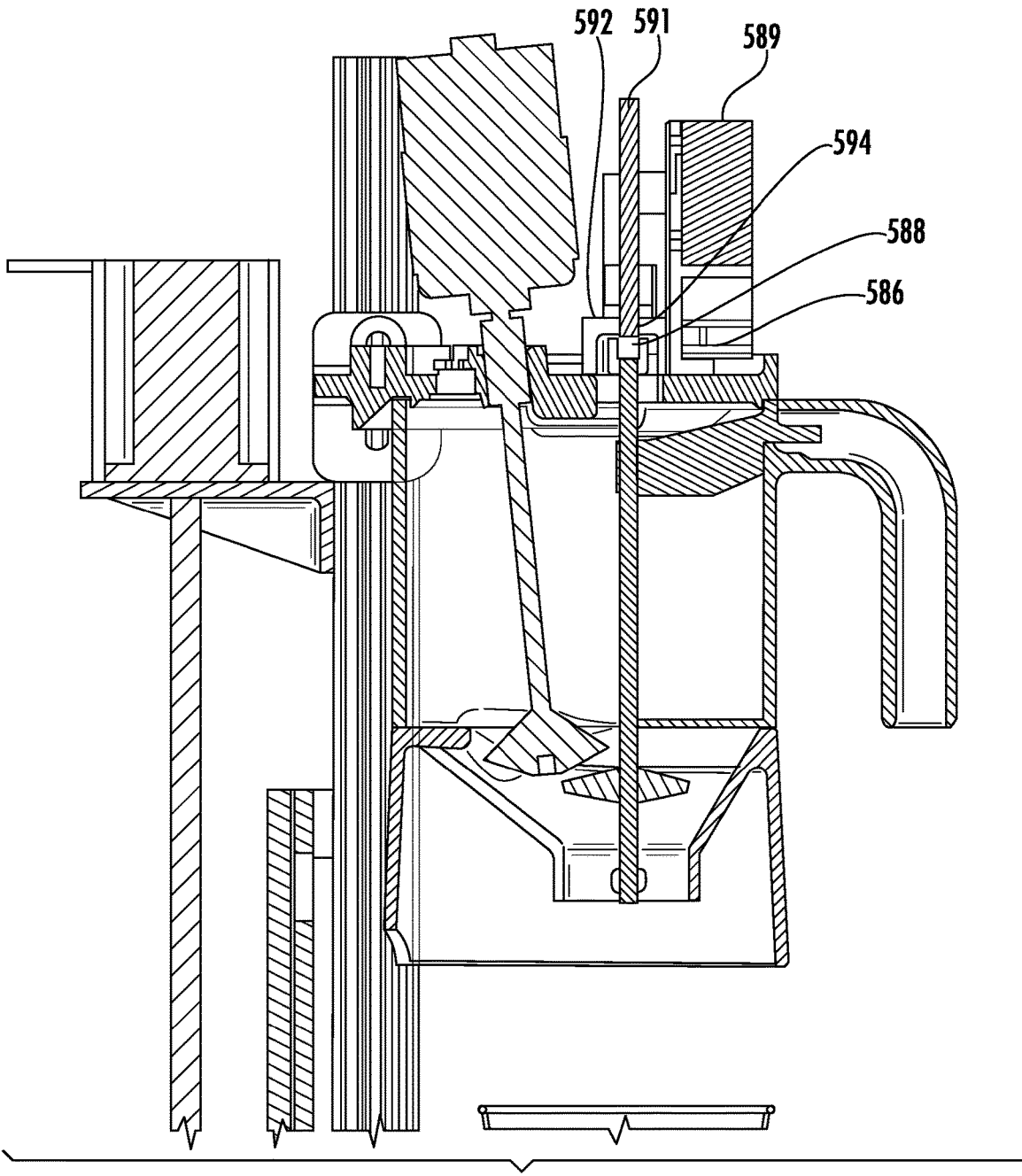
Figure 29F:
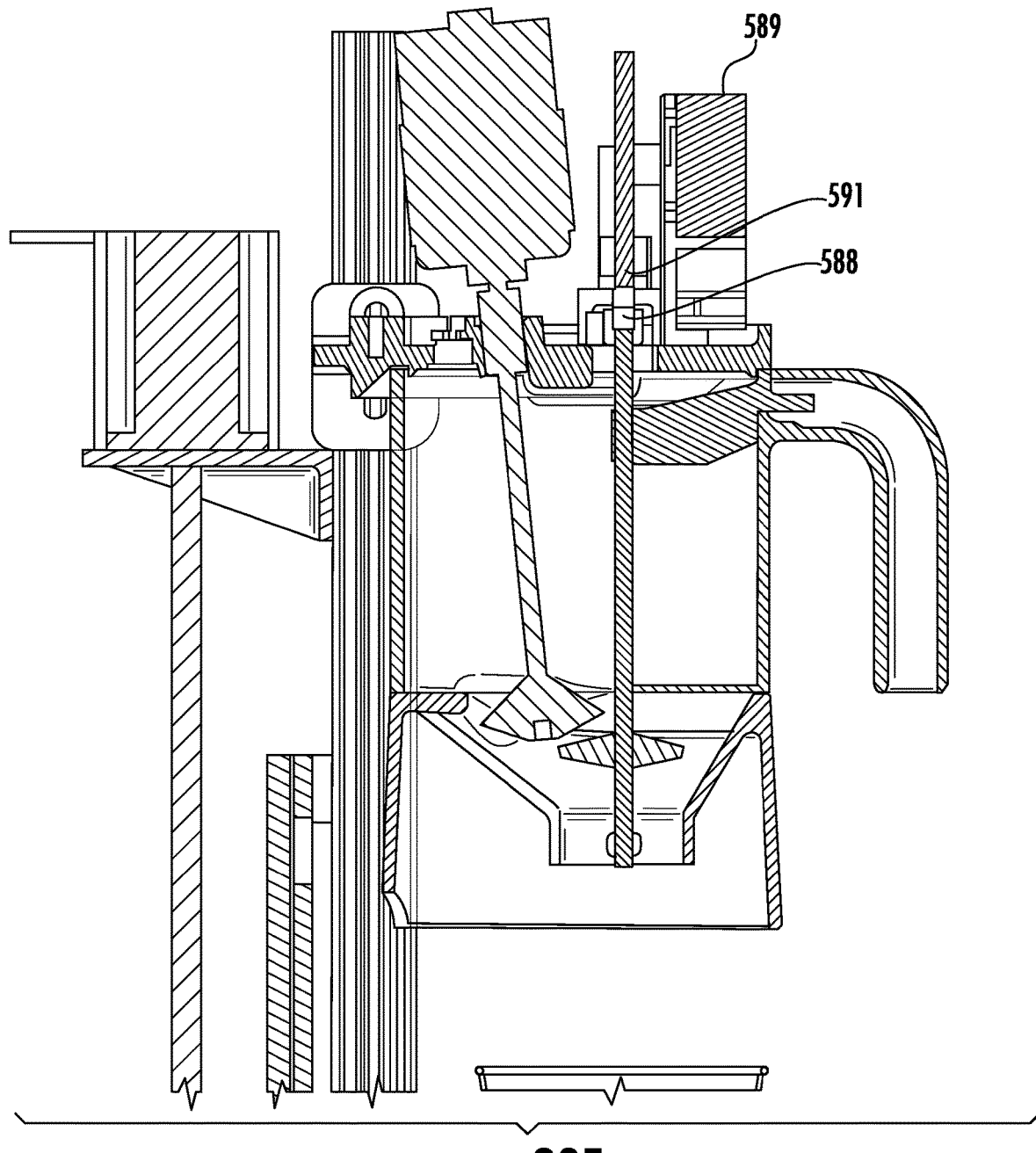
Figure 29G:
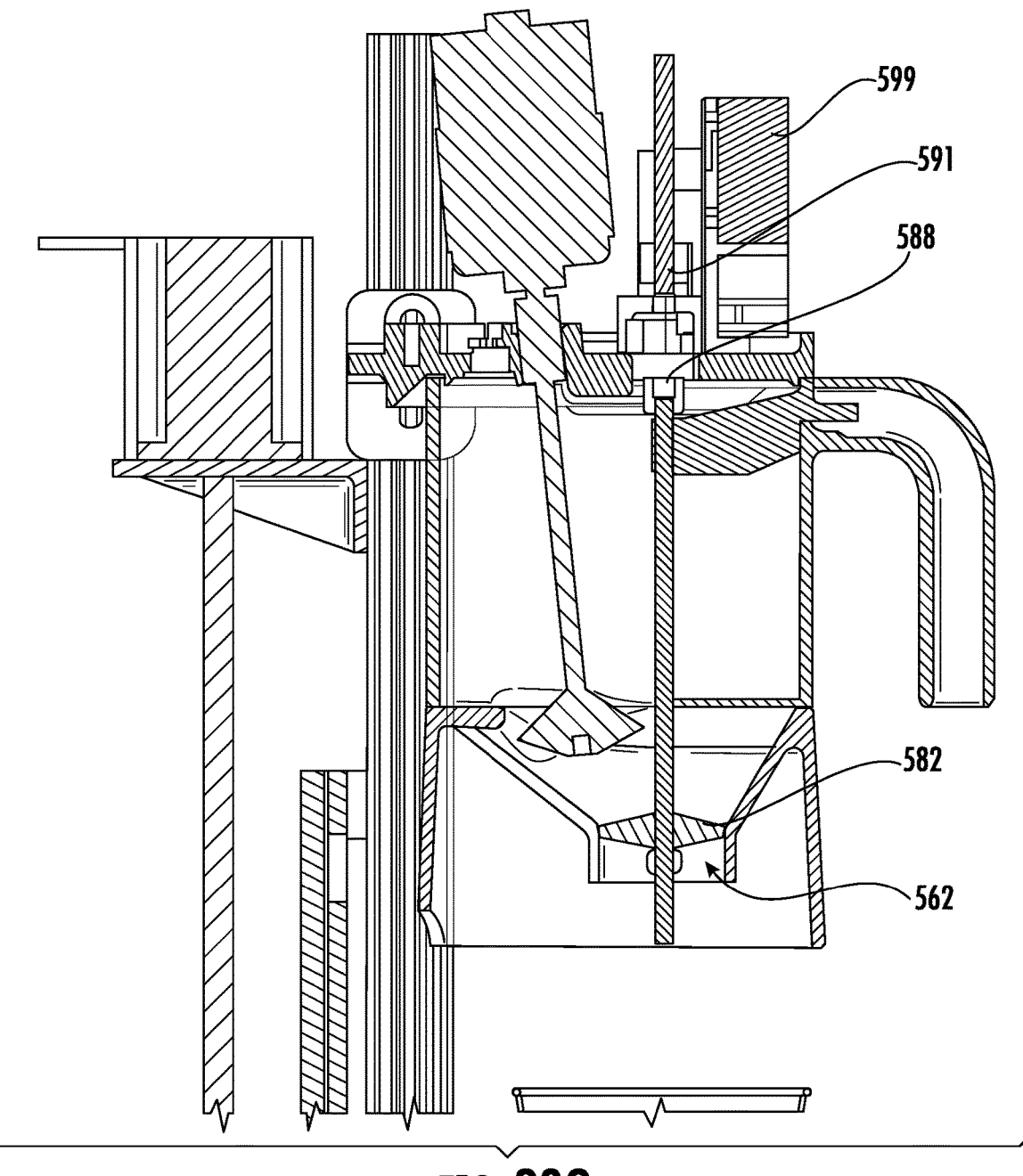
Figure 29H:
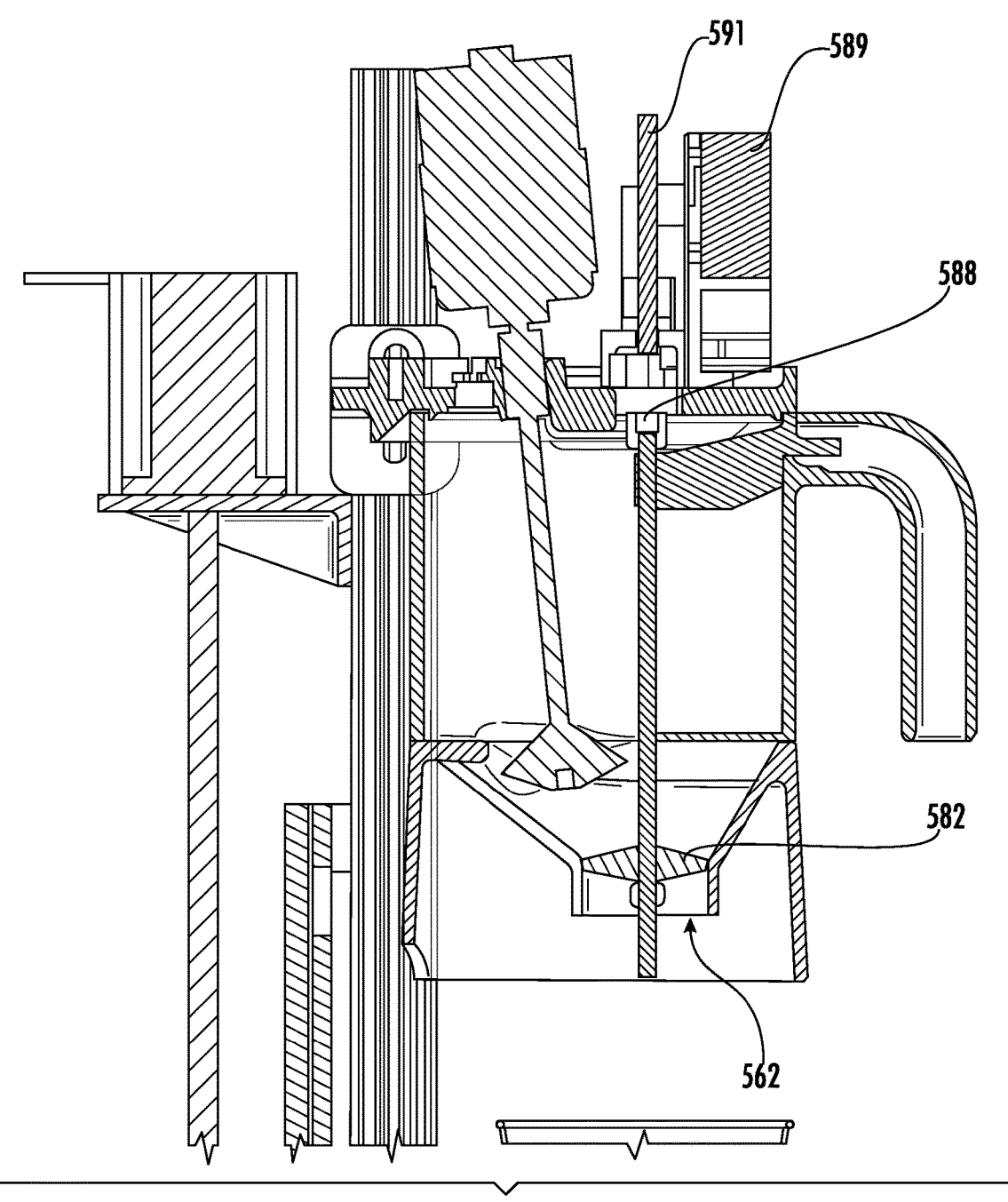

When the foam has been dispensed, the motor 589 continues to drive the toothed bar 591 upwardly. The shoulder 586 of the poppet valve 580, which contains the magnet 588, contacts the underside of the raised boss 592 (FIG. 29E). Because the hole 594 is smaller than the shoulder 586 of the poppet valve 580, continued ascension of the toothed bar 591 separates the lower end of the toothed bar 591 from the magnet 588 (FIG. 29F). Once separated, gravity induces the poppet valve 580 to descend to its lowered position (FIG. 29G), such that the stopper 582 fills the outlet 562 and no further foam flows through the outlet 562. The motor 589 then drives the toothed bar 591 slightly downwardly back to its original position (FIG. 29H) to await another frothing operation.

Figure 30A:
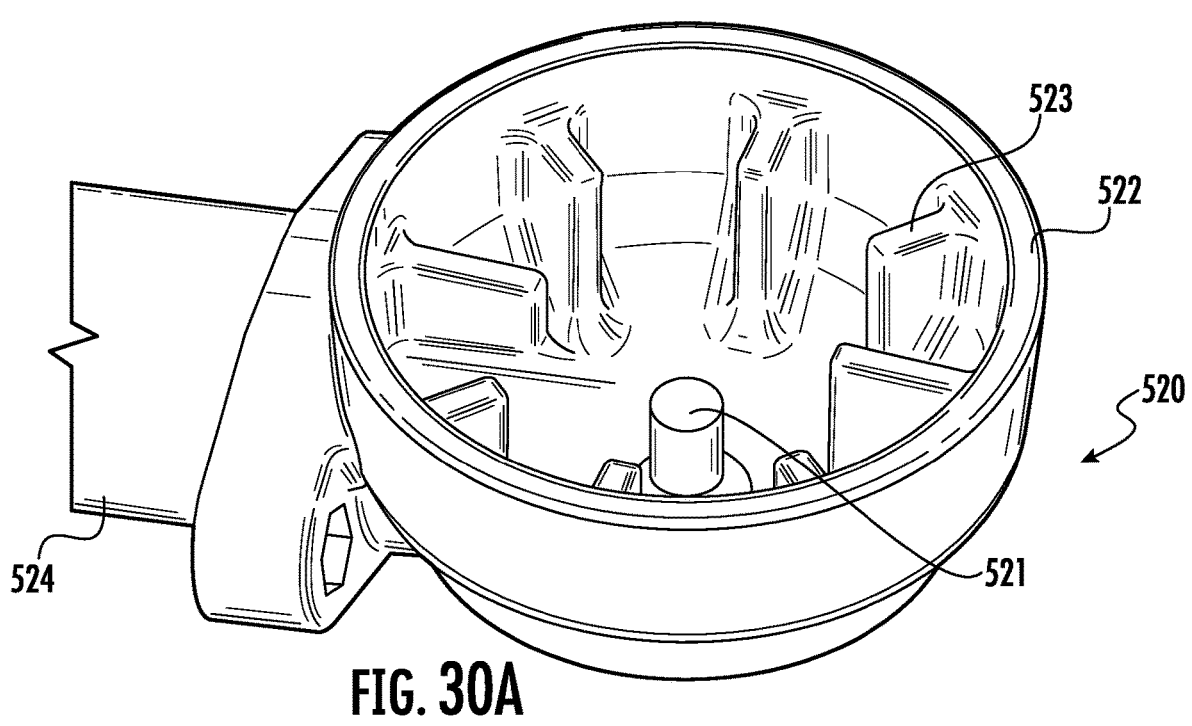
FIG. 30A is an enlarged partial perspective view of the cupholder of the frothing appliance of FIG. 26.
Figure 30B:
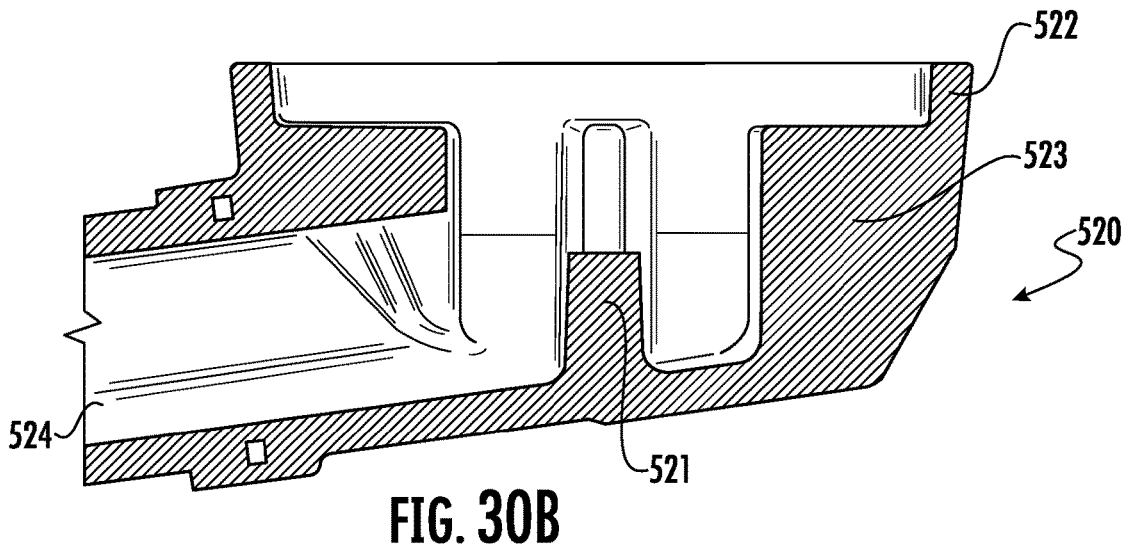
FIG. 30B is a side section view of the cupholder of FIG. 30A.
Figure 31A:
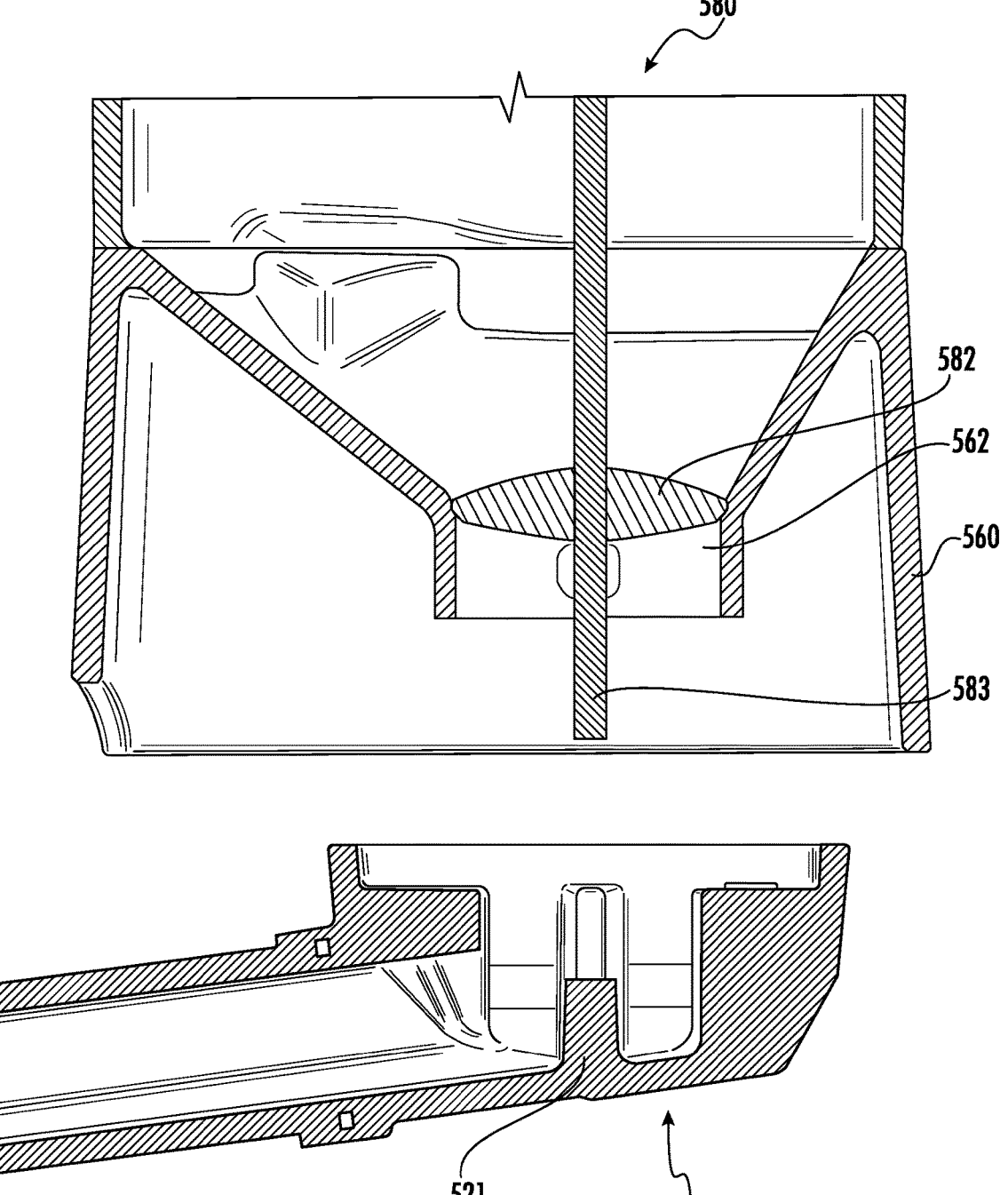
FIG. 31A is side section view of the cupholder of FIG. 30A beneath the vessel of the frothing appliance of FIG. 26 prior to releasing the poppet valve.
Figure 31B:
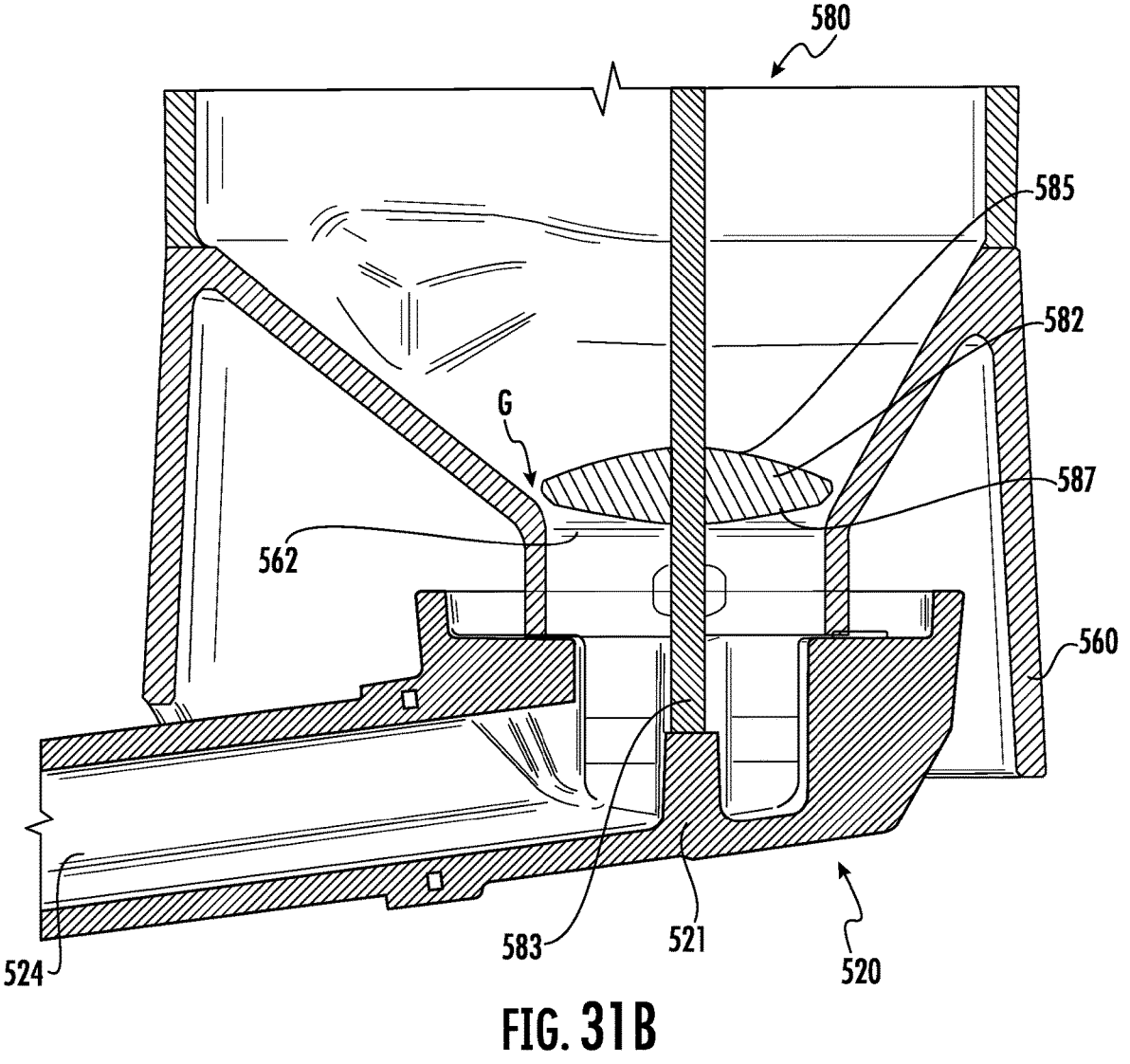
FIG. 31B is a side section view of the poppet valve and vessel of FIG. 31A showing the poppet valve lifted by the cupholder to its rinse position.

Rinsing of the vessel 560 is then carried out in the following manner. Water is released into the vessel 560 with the poppet valve 580 positioned to prevent drainage through the outlet 562 of the vessel 560. When the vessel 560 is to be drained of rinse water, the cupholder 520 is raised by the motor 542 to a position beneath the vessel 560 (see FIGS. 31A and 31B). As shown in FIGS. 30A and 30B, the cupholder 520 has a central post 521 in the center of a concave bowl 522 that feeds into the drainage section 524. Gussets 523 extend above the upper end of the post 521 to support surfaces for a cup being filled, and also extend radially inward of the walls of bowl 522, but terminate well short of the post 521. Thus, as the cupholder 520 rises to a raised position beneath the vessel, the post 521 contacts the lower end of the lower rod 583 of the poppet valve 580 and drives the poppet valve 580 slightly upward (FIG. 31B). The upward movement of the poppet valve 580 creates a small gap G between the stopper 582 and the outlet 562 of the vessel 560. Rinse water travels through the gap G, out of the outlet 562, and into the bowl 522 of the cupholder 520. From there, the water drains into the drainage section 524, then proceeds to a drainage structure like the drainage basin 325 of FIG. 24 and out of the appliance 510.

In some embodiments, the gap G may be between about ¹⁄₁₆ and ¼ inch (e.g., about ⅛ inch). Such a gap may create a nozzle-like effect for water flowing through the gap G, which can assist with rinsing. In addition, in some embodiments the convex lower surface 587 of the stopper 582 encourages at least some of the rinse water to flow along the lower surface 585 rather than descending directly through the outlet 562. Such flow can assist in cleaning the lower surface 587 and lower rod 583 of the poppet valve 580 during rinsing.

When rinsing is complete, the controller 538 signals the motor 542 to lower the cupholder 520 to its lowered position, where it is ready to commence the next frothing operation.

Also visible in FIGS. 28A-D are four position sensors 600, 602, 604, 606. These sensors, which are operatively connected with the controller 538, can detect the presence of an object (e.g., a cup), and may be employed to alert the frothing appliance 510 to (a) the presence of a cup in the cupholder 520, and (b) the size/height of the cup. For example, an extra large cup may be detected by all four sensors 600, 602, 604, 606, a large cup may be detected only by the three lowest sensors 600, 602, 604, a medium cup may be detected by only the two lowest sensors 600, 602, and a small cup may be detected only by the lowest sensor 600. The controller 528 receives the information from the sensors 600, 602, 604, 606 and can then determine how much (if at all) to raise the cupholder 520 to receive foam from the vessel 560 after frothing.

As an alternative, the frothing appliance 510 may include fewer sensors and rely on timing or other parameters to select a height for the cupholder 520. As an example, two sensors may be employed; one of these may be deployed in a low position, such that a cup of any size is detected, and a second of these may be deployed at a position above the height of the highest cup where the cupholder 520 is to stop. Once the cupholder starts to rise, it will continue to rise until the second sensor detects its presence, at which time it ceases to rise and is in position to receive foam from the vessel. Other variations/sequences/control logic pathways may also be employed.

It also may be noted that in any of the embodiments described above, the cupholder/cupholder may be detachable for easy cleaning.

Figure 32A:
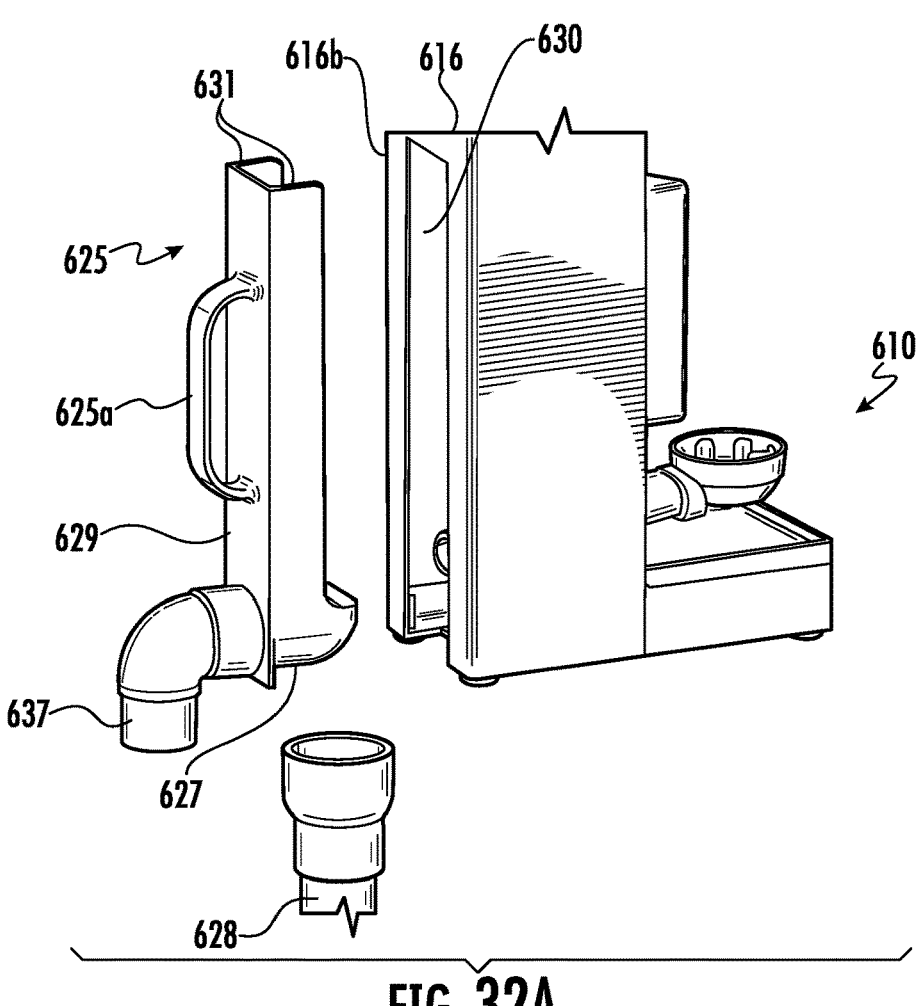
FIG. 32A is a partial rear exploded perspective view of a frothing appliance according to additional embodiments of the invention, wherein the drainage basin forms part of the rear wall of the tower and it is detachable therefrom.
Figure 32B:
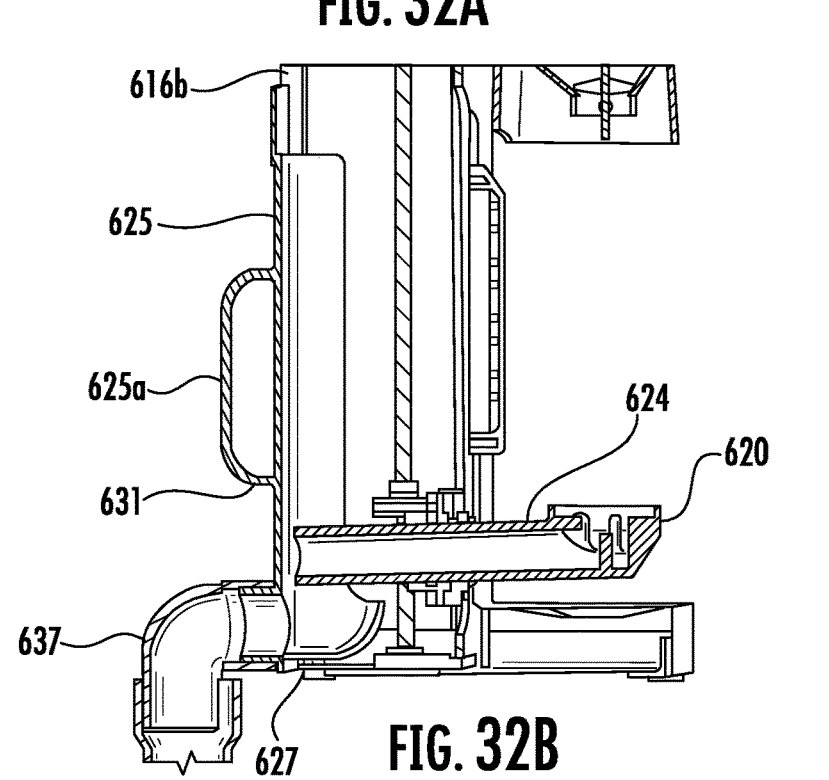
FIG. 32B is a side section view of the frothing appliance of FIG. 32A, with the drainage basin inserted into position to receive water from the drain.

A further alternative embodiment of a frothing appliance is shown in FIGS. 32A and 32B and designated broadly at 610. The frothing appliance 610 is similar to the frothing appliance 510, but includes a drainage basin 625 that is detachable from the rear wall 616*b* of the tower 616 and fits within an aperture 630 in the rear wall 616*b*. The drainage basin 625 includes a handle 625*a* to assist with removal and insertion. The drainage basin 625 also includes a rear wall 629, shields 631, and floor 627 that are similar to those of the drainage basin 425. A spigot 637 extends from the rear wall 629 and leads to a drain line 628. A cupholder 620 and drainage segment 624 drain into and can be raised or lowered relative to the drainage basin 625.

The drainage basin 625 may be secured to the rear wall 616*b* via any convenient means, such as latches, a friction fit, screws, or the like. It can be envisioned that a detachable drainage basin may be advantageous for periodic cleaning of the frothing appliance 610.

Those of skill in this art will appreciate that the drainage basin may be located elsewhere, or may be formed by other components. For example, a separate, detachable wall or cover may be fitted to the front portion of the tower, and water may drain from the cupholder through the drainage segment to a space rearward of the cover and into the drainage line. This arrangement enables the cover to be removed and washed as needed. In this arrangement, the cupholder lifting mechanism may be offset from center to allow the drainage segment of the cupholder to drain into the aforementioned space rearward of the cover.

Figure 33A:
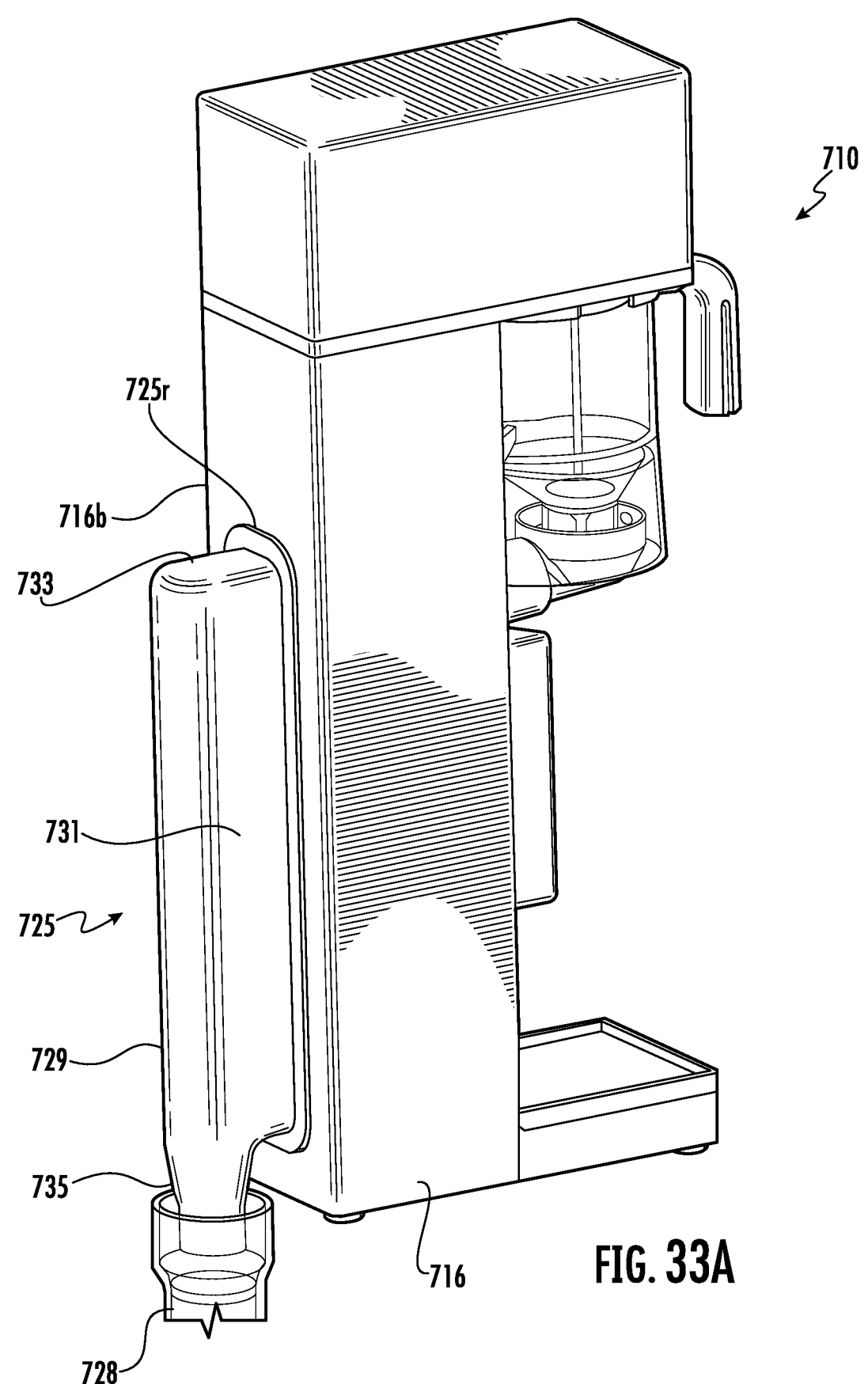
FIG. 33A is a rear perspective view of a frothing appliance according to further embodiments of the invention.
Figure 33B:
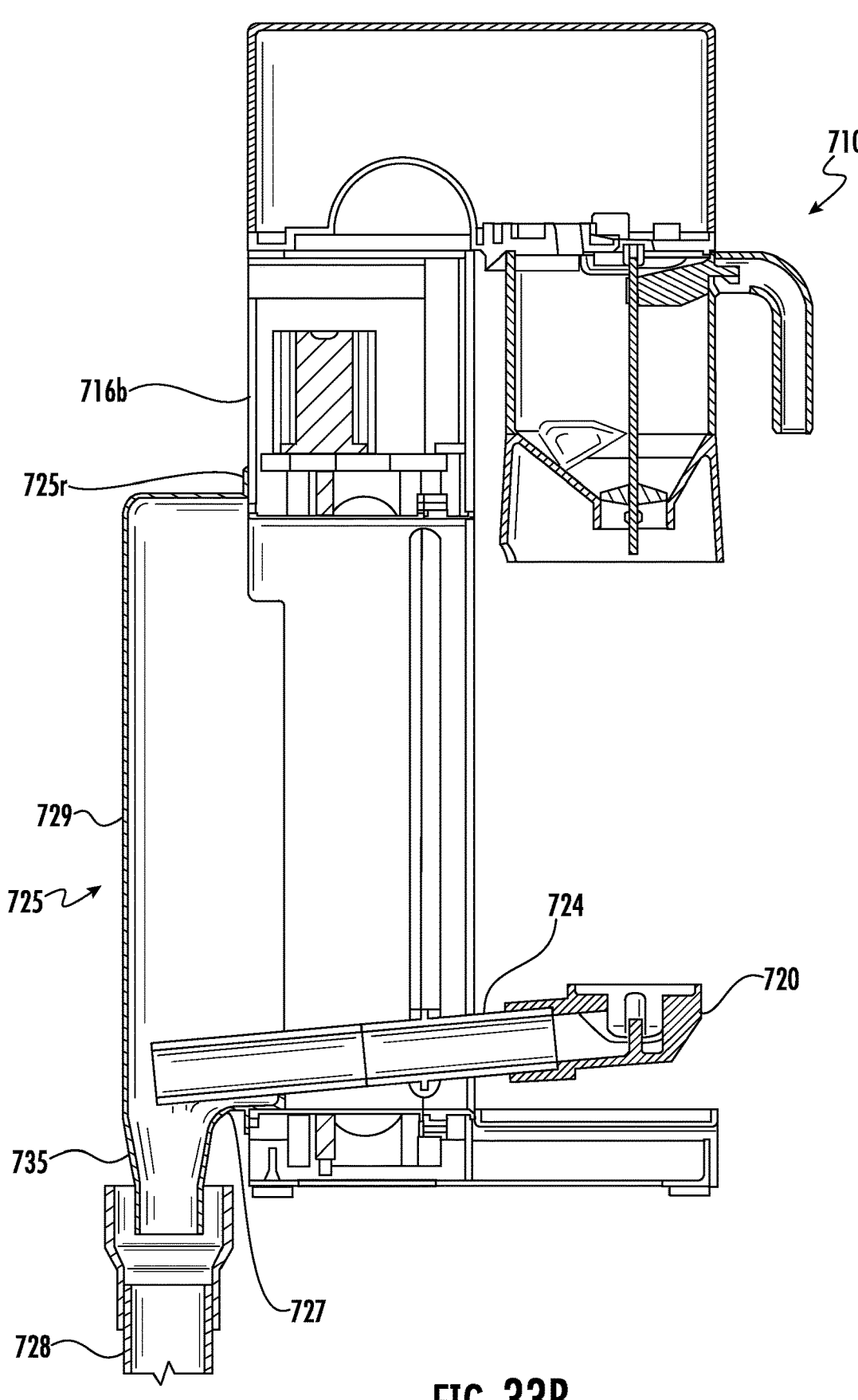
FIG. 33B is a side section view of the frothing appliance of FIG. 33A, with the cupholder and drainage shown in a lowered position.
Figure 33C:
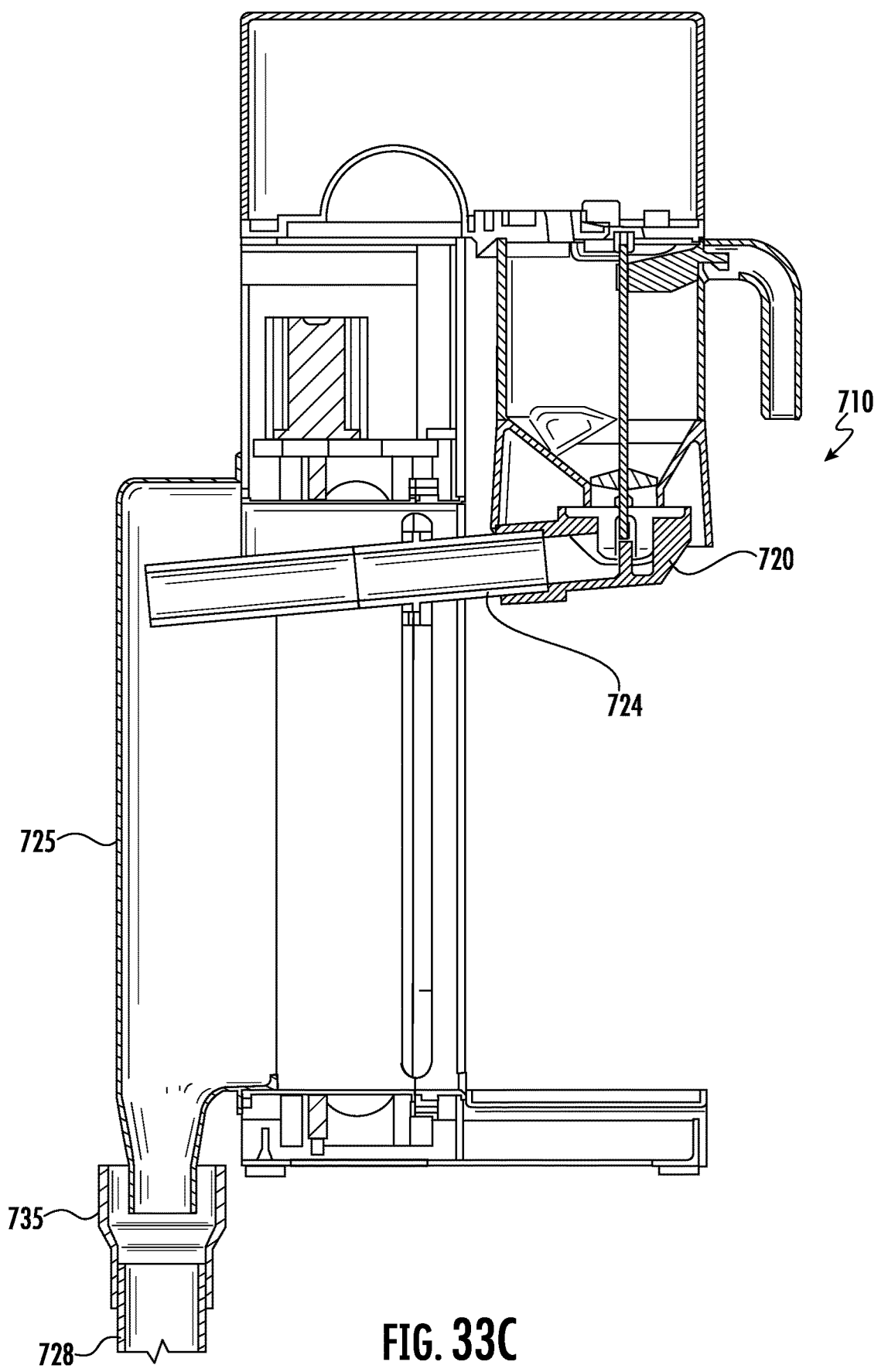
FIG. 33C is a side section view of the frothing appliance of 33A, with the cupholder and drainage segment shown in a raised position.

Referring now to FIGS. 33A-33C, another frothing appliance, designated broadly at 710, is shown therein. The frothing appliance 710 is similar to the frothing appliance 610, but its drainage basin 725 resides largely rearwardly of the rear wall 716*b* of the tower 716. As can be seen in FIG. 33A, the drainage basin 725 includes a rim 725*r* that surrounds sidewalls 731, a ceiling 733, and a floor 727. The rim 725*r* abuts and overlies the rear wall 716*b* of the tower 716. The rear wall 729 of the drainage basin 725 spans the side walls 731 and protrudes rearwardly with a convex profile. A spout 735 is positioned rearwardly of the floor 727 and leads to a drainage line 728.

As with the drainage basin 625, the drainage basin 725 is detachable for easy cleaning. In addition, because drainage into the drainage basin from the cupholder 720 and drainage segment 724 occurs rearwardly of the rear wall 716*b* of the tower 716, there may be less splattering of waste water into the interior of the tower 716 as it is being drained.

Referring now to FIGS. 34-36C, another frothing appliance, designated broadly at 810, is shown therein. The frosting appliance 810 is similar to the frothing appliance 710, in that it includes a frothing tool 844, a vessel 860, and a cup holder 820 (see FIG. 36C) for raising a cup C and collecting rinse water. However, the frothing appliance 810 includes a valve 880 and an actuating mechanism 890 that differ from those described above.

Figures 34, 35:
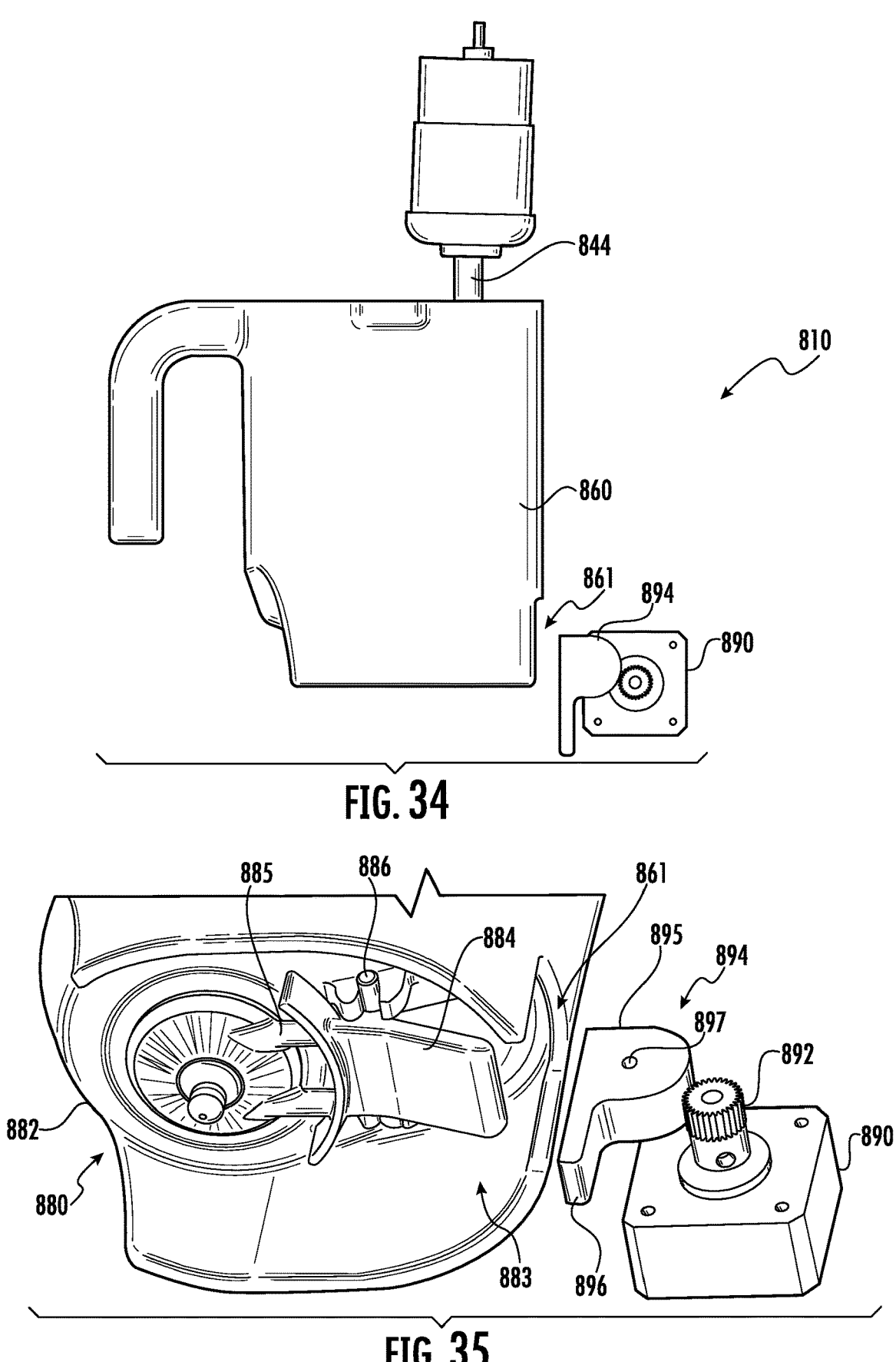
FIG. 34 is a partial side view of a frothing appliance according to further embodiments of the invention.
FIG. 35 is an enlarged, partial bottom perspective view of the valve and actuating mechanism of the frothing appliance of FIG. 34.
Figure 36A:
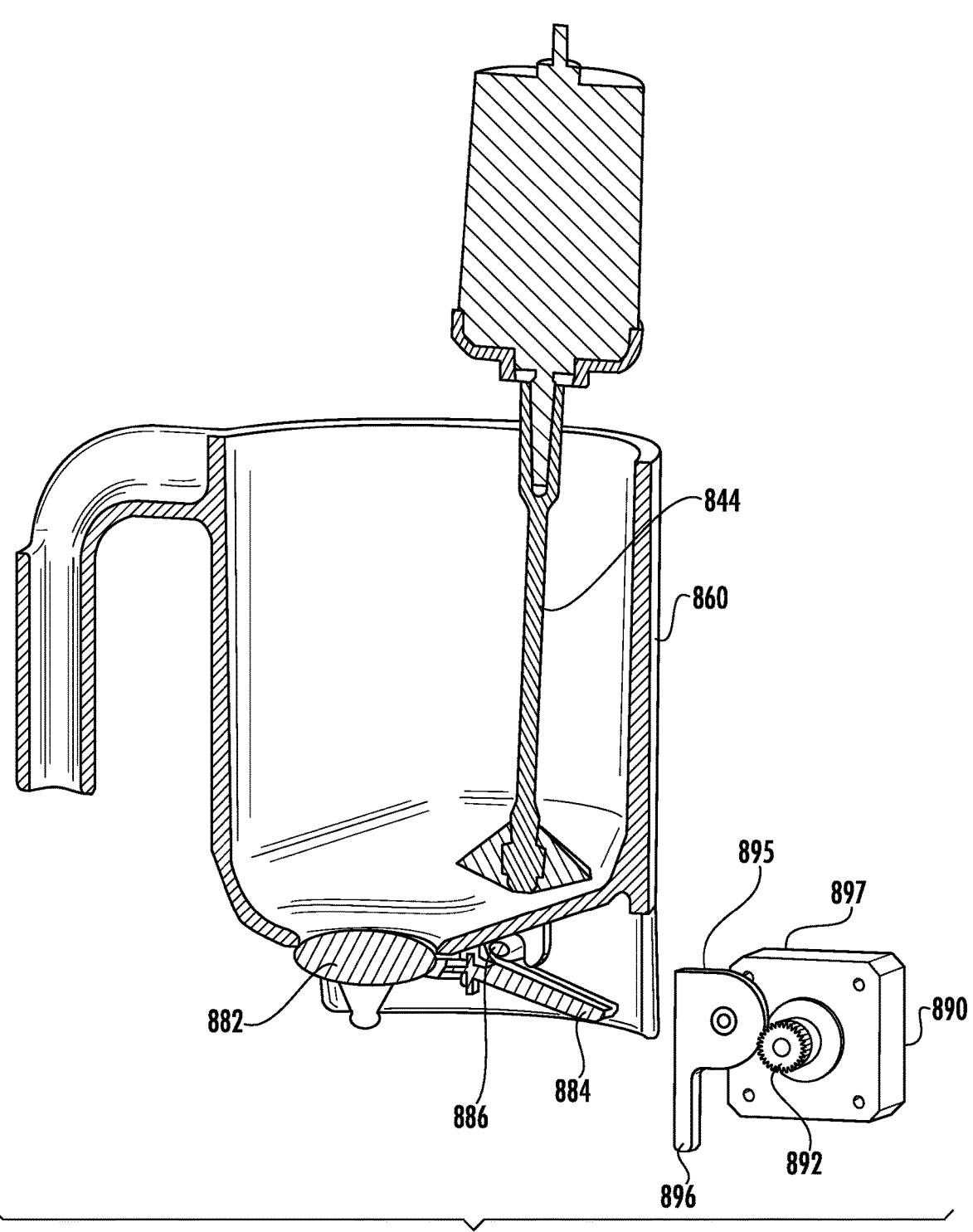
FIG. 36A is a side section view of the frothing appliance of FIG. 34 with the valve in a closed position.

Referring to FIG. 35, the valve 880 includes a stopper 882 and an arm 883 that has a finger 884 and two braces 885 that extend between the finger 884 in the stopper 882. As can be seen in FIG. 36A, the finger 884 is disposed at a slight angle to the braces 885. Two posts 886 are received in clips 865 that extend from the bottom surface of the vessel 860 and define a pivot axis. A spring (not shown) is associated with the valve 880 to bias the valve toward the closed position of FIGS. 35 and 36A.

Still referring to FIG. 35, the actuating mechanism 890 includes a motor 891 with a toothed shaft 892. The motor 891 is mounted within the tower 16 of the housing 12. An actuating member 894 with a main body 895 is mounted to the tower 16 of the housing 12 at a pivot 897. A portion of the surface of the main body 895 is toothed and engages the teeth of the shaft 892 Of the motor 891. A finger 896 extends from the main body 895.

Referring now to FIG. 36A, therein the valve 880 is shown in its closed position. In this position, the stopper 882 seals the outlet 864 in the vessel 860 from below. The spring biases the stopper 882 toward this position, such that the valve 880 remains closed unless moved by the actuating mechanism 890. In the rest position, the actuating member 894 is rotated about the pivot 897 so that the finger 896 extends downwardly from the main body 895. The valve 880 and actuating mechanism 890 remain in this position for all operations in which the frothing appliance 810 requires that the vessel 860 be closed.

Figure 36B:
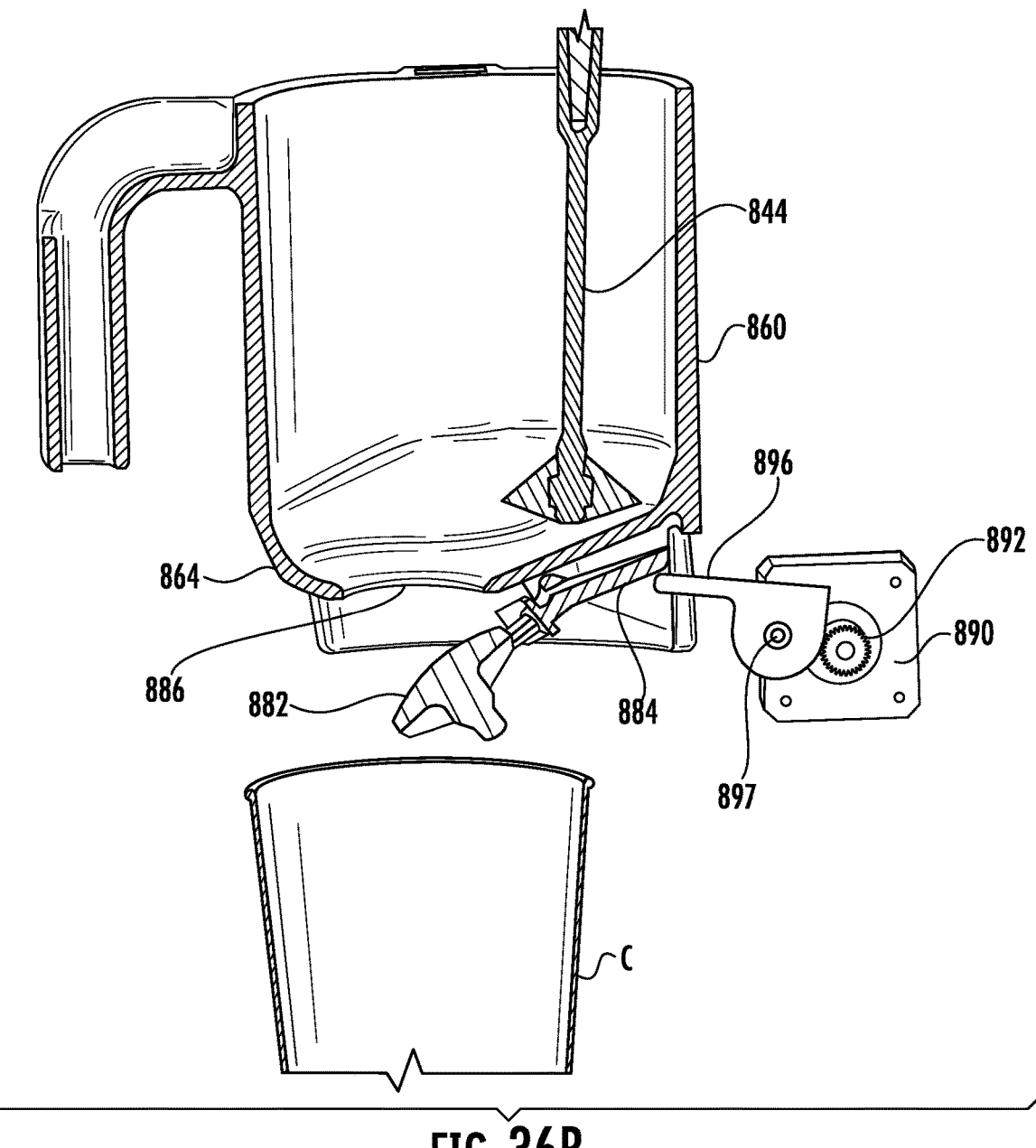
FIG. 36B is a side section view of the frothing appliance of FIG. 34 with the valve in an open position for dispensing into a cup.
Figure 36C:
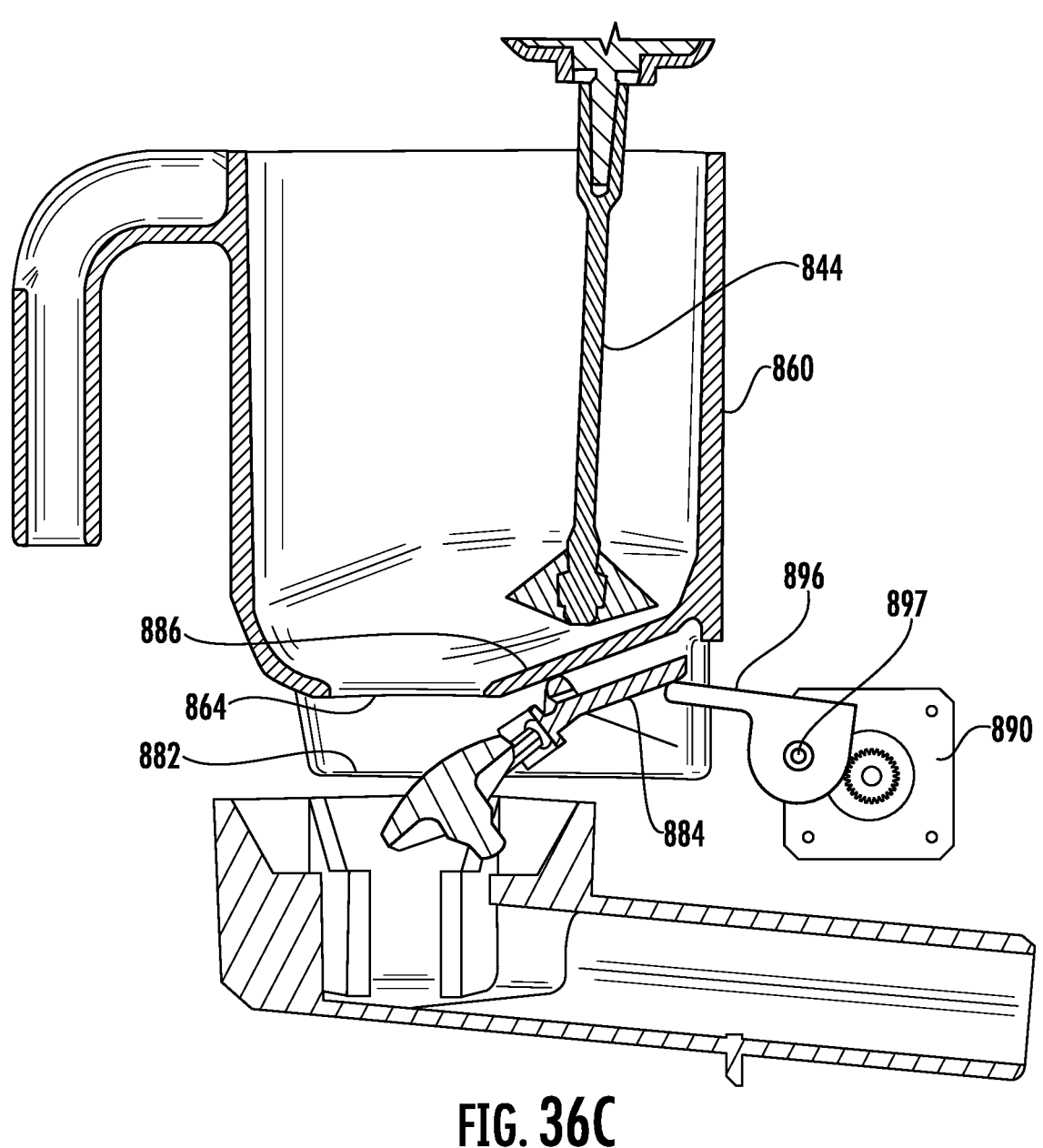
FIG. 36C is a side section view of the frothing appliance of FIG. 34 with the valve in an open position for rinsing, wherein the cupholder is raised to collect the rinse water.

FIG. 36B illustrates the valve 880 and the actuating mechanism 890 in the open position. To open the valve 880, the controller of the frothing appliance 810 signals the motor 891 to rotate the shaft 892. Rotation of the shaft 892 causes the actuating member 894 to rotate about the pivot 897 to raise the finger 896 toward the finger 884 of the valve 880 (such rotation is clockwise in FIGS. 36A-C). Note that the vessel 860 includes a slot 861 in its lower rim to accommodate the movement of the finger 896. The finger 896 of the actuating member 894 engages the lower surface of the finger 884 of the valve 880 and forces it upwardly. This movement rotates the valve 880 about the pivot axis defined by the posts 886, which in turn lowers the stopper 882 away from the outlet 864 of the vessel 860. Opening of the valve 880 allows the frothing appliance 810 to perform operations that require the vessel 860 to drain from its lower end. Such operations may include dispensing of frothed liquid from the vessel 860 into a cup C (FIG. 36B), and rinsing the vessel 860 and collecting the rinse water in a raised cup holder 820 (FIG. 36C).

Those are skill in this art will recognize that the frothing appliance 810 may take other forms. For example, the actuating mechanism 890 may be configured so that the actuating member 894 is connected directly to and fixed relative to the shaft of the motor 891. As another example, the valve 880 may be configured so that it slides relative to the vessel 860 for opening and closing rather than relying on a pivoting action. Other possibilities may also be contemplated by those of skill in this art.

Some embodiments of the present invention are exemplarily described above in combination with the accompanying drawings. Those of ordinary skill in the art to which the present invention belongs should understand that specific structures shown in the above embodiments are merely exemplary, rather than limiting. Moreover, those of ordinary skill in the art to which the present invention belongs can combine a variety of technical features shown above according to a variety of possible manners to constitute new technical solutions or make other modifications, and these new technical solutions are encompassed within the scope of the present invention.

That which is claimed is:

1. An automated self-cleaning frothing appliance, comprising:

a housing having a base, a tower extending upwardly from the base, and a canopy extending generally horizontally from an upper portion of the tower and above the base;

a frothing vessel mounted beneath the canopy, the frothing vessel having an open upper end and an outlet at its lower end;

a frothing tool extending from the canopy into the frothing vessel, the frothing tool being operatively connected with a drive unit mounted in the housing;

a cupholder positioned directly beneath the frothing vessel configured to hold a cup, the cup positioned to receive frothed liquid from the frothing vessel;

a first fluid pathway in the housing configured to receive water from a water source and routed to deliver water into the frothing vessel;

a valve positioned to selectively open and close the outlet to the frothing vessel;

a valve-opening mechanism attached to the housing configured to selectively open and close the valve;

a drain positioned beneath the outlet to receive water draining from the outlet;

a second fluid pathway routed from the drain and configured to deliver water to an external waste water receptacle; and a controller that is operatively connected with the drive unit, the first fluid pathway and the valve-opening mechanism.

2. The automated self-cleaning frothing appliance defined in claim 1, wherein the drive unit comprises a motor mounted in the housing.

3. The automated self-cleaning frothing appliance defined in claim 1, wherein the frothing vessel is removably attached to the housing.

4. The automated self-cleaning frothing appliance defined in claim 3, wherein the valve is attached to the frothing vessel and is removable with the frothing vessel from the housing.

5. The automated self-cleaning frothing appliance defined in claim 4, wherein the frothing vessel has an oblong cross-section.

6. The automated self-cleaning frothing appliance defined in claim 5 wherein the outlet is laterally offset from the frothing tool.

7. The automated self-cleaning frothing appliance defined in claim 3, wherein the valve comprises a stopper that is positioned in the outlet when the valve is closed and that is raised above the outlet when the valve is opened.

8. The automated self-cleaning frothing appliance defined in claim 7, wherein the valve includes an upper end that comprises a magnet, and wherein the valve-opening mechanism is configured to attract the magnet to raise the valve from the outlet.

9. The automated self-cleaning frothing appliance defined in claim 8, wherein the valve-opening mechanism comprises an activatable solenoid.

10. The automated self-cleaning frothing appliance defined in claim 8, wherein the valve-opening mechanism comprises a member that is lowered to attract the magnet of the valve.

11. The automated self-cleaning frothing appliance defined in claim 1, wherein the drain is located in the base.

12. The automated self-cleaning frothing appliance defined in claim 1, wherein the base includes the cupholder.

13. The automated self-cleaning frothing appliance defined in claim 12, wherein the drain is located in the cupholder.

14. The automated self-cleaning frothing appliance defined in claim 12, further comprising at least one sensor mounted to the housing to detect the presence of a cup on the cupholder, the at least one sensor being operatively connected with the controller.

15. The automated self-cleaning frothing appliance defined in claim 14, wherein the at least one sensor is a plurality of sensors mounted to the housing, wherein the location of the sensors enables the controller to determine a size of a cup.

16. The automated self-cleaning frothing appliance defined in claim 1, further comprising a plurality of sensors mounted to the housing to detect the presence of a cup on the cupholder, the sensors being operatively connected with the controller.

17. The automated self-cleaning frothing appliance defined in claim 1, further comprising a cupholder lifting mechanism, and wherein the cupholder lifting mechanism, the cupholder and the valve are configured such that the cupholder engages the valve to open the outlet when water is drained from the outlet into the drain.

18. The automated self-cleaning frothing appliance defined in claim 1, wherein the frothing vessel is mounted beneath the canopy via one or more magnets.

19. An automated self-cleaning frothing appliance, comprising:

a housing having a base, a tower extending upwardly from the base, and a canopy extending generally horizontally from an upper portion of the tower and above the base;

a frothing vessel mounted beneath the canopy, the frothing vessel having an open upper end and an outlet at its lower end;

a frothing tool extending from the canopy into the frothing vessel, the frothing tool being operatively connected with a drive unit mounted in the housing;

a first fluid pathway in the housing configured to receive water from a water source and routed to deliver water into the frothing vessel;

a valve positioned to selectively open and close the outlet to the frothing vessel;

a valve-opening mechanism attached to the housing configured to selectively open and close the valve;

a drain positioned beneath the outlet to receive water draining from the outlet;

a second fluid pathway routed from the drain and configured to deliver water to an external waste water receptacle; and a controller that is operatively connected with the drive unit, the first fluid pathway and the valve-opening mechanism;

wherein the base includes a cupholder for a cup to receive frothed liquid from the frothing vessel;

wherein the drain is located in the cupholder; and further comprising a cupholder lifting mechanism mounted to the housing and attached to the cupholder that is configured to raise and lower the cupholder relative to the base.

\* \* \* \* \*